US011663481B2

(12) United States Patent
Liu et al.

(10) Patent No.: US 11,663,481 B2
(45) Date of Patent: May 30, 2023

(54) NEURAL NETWORK ARCHITECTURE PRUNING

(71) Applicant: Adobe Inc., San Jose, CA (US)

(72) Inventors: Shikun Liu, London (GB); Zhe Lin, Fremont, CA (US); Yilin Wang, San Jose, CA (US); Jianming Zhang, Campbell, CA (US); Federico Perazzi, San Jose, CA (US)

(73) Assignee: Adobe Inc., San Jose, CA (US)

( * ) Notice: Subject to any disclaimer, the term of this patent is extended or adjusted under 35 U.S.C. 154(b) by 527 days.

(21) Appl. No.: 16/799,191

(22) Filed: Feb. 24, 2020

(65) Prior Publication Data

US 2021/0264278 A1 Aug. 26, 2021

(51) Int. Cl.
*G06N 3/082* (2023.01)
*G06N 3/04* (2023.01)

(52) U.S. Cl.
CPC ............... *G06N 3/082* (2013.01); *G06N 3/04* (2013.01)

(58) Field of Classification Search
CPC ........ G06N 3/082; G06N 3/04; G06N 3/0445; G06N 3/0472; G06N 3/084; G06N 3/0454
See application file for complete search history.

(56) References Cited

U.S. PATENT DOCUMENTS

| 6,882,992 | B1 | 4/2005 | Werbos |
| 10,970,441 | B1 | 4/2021 | Zhang et al. |
| 2017/0046616 | A1 | 2/2017 | Socher et al. |
| 2017/0161640 | A1 | 6/2017 | Shamir |
| 2018/0225823 | A1 | 8/2018 | Zhou et al. |
| 2018/0357893 | A1 | 12/2018 | Dong et al. |
| 2019/0213482 | A1 | 7/2019 | Socher et al. |
| 2019/0294929 | A1* | 9/2019 | Yao ...................... G06V 20/597 |
| 2020/0314827 | A1 | 10/2020 | Ge et al. |
| 2020/0387783 | A1 | 12/2020 | Bagherinezhad et al. |
| 2020/0410365 | A1 | 12/2020 | Cheung et al. |

(Continued)

OTHER PUBLICATIONS

Guo, et al., "Training Efficient Network Architecture and Weights via Direct Sparsity Control", arXiv:2002.04301v1 [cs.LG] (Year: 2020).*

(Continued)

*Primary Examiner* — Matthew Mikels
(74) *Attorney, Agent, or Firm* — Keller Preece PLLC

(57) ABSTRACT

The disclosure describes one or more implementations of a neural network architecture pruning system that automatically and progressively prunes neural networks. For instance, the neural network architecture pruning system can automatically reduce the size of an untrained or previously-trained neural network without reducing the accuracy of the neural network. For example, the neural network architecture pruning system jointly trains portions of a neural network while progressively pruning redundant subsets of the neural network at each training iteration. In many instances, the neural network architecture pruning system increases the accuracy of the neural network by progressively removing excess or redundant portions (e.g., channels or layers) of the neural network. Further, by removing portions of a neural network, the neural network architecture pruning system can increase the efficiency of the neural network.

20 Claims, 15 Drawing Sheets

(56) References Cited

U.S. PATENT DOCUMENTS

2021/0241112 A1  8/2021  Dai et al.

OTHER PUBLICATIONS

Vijay Badrinarayanan, Alex Kendall, and Roberto Cipolla. Segnet: A deep convolutional encoder-decoder architecture for image segmentation. IEEE transactions on pattern analysis and machine intelligence, 39(12):2481-2495, 2017.

Andrew Brock, Theodore Lim, James M Ritchie, and Nick Weston. Smash: one-shot model architecture search through hypernetworks. arXiv preprint arXiv:1708.05344, 2017.

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016.

Jonathan Frankle and Michael Carbin. The lottery ticket hypothesis: Finding sparse, trainable neural networks. arXiv preprint arXiv:1803.03635, 2018.

Ariel Gordon, Elad Eban, Ofir Nachum, Bo Chen, Hao Wu, Tien-Ju Yang, and Edward Choi. Morphnet: Fast & simple resource-constrained structure learning of deep networks. In Proceedings of the IEEE Conference on Computer Vision and Pattern Recognition, pp. 1586-1595, 2018.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Hanxiao Liu, Karen Simonyan, and Yiming Yang. Darts: Differentiable architecture search. arXiv preprint arXiv:1806.09055, 2018.

Zhuang Liu, Jianguo Li, Zhiqiang Shen, Gao Huang, Shoumeng Yan, and Changshui Zhang. Learning efficient convolutional networks through network slimming. In Proceedings of the IEEE International Conference on Computer Vision, pp. 2736-2744, 2017.

Christos Louizos, Max Welling, and Diederik P Kingma. Learning sparse neural networks through $l\_0$ regularization. arXiv preprint arXiv:1712.01312, 2017.

Pushmeet Kohli Nathan Silberman, Derek Hoiem and Rob Fergus. Indoor segmentation and support inference from rgbd images. In ECCV, 2012.

Hieu Pham, Melody Y Guan, Barret Zoph, Quoc V Le, and Jeff Dean. Efficient neural architecture search via parameter sharing. arXiv preprint arXiv:1802.03268, 2018.

Siyuan Qiao, Zhe Lin, Jianming Zhang, and Alan Yuille. Neural rejuvenation: Improving deep network training by enhancing computational resource utilization. arXiv preprint arXiv:1812.00481, 2018.

Esteban Real, Alok Aggarwal, Yanping Huang, and Quoc V Le. Regularized evolution for image classifier architecture search. arXiv preprint arXiv:1802.01548, 2018.

Karen Simonyan and Andrew Zisserman. Very deep convolutional networks for large-scale image recognition. arXiv preprint arXiv:1409.1556, 2014.

Barret Zoph and Quoc V Le. Neural architecture search with reinforcement learning. arXiv preprint arXiv:1611.01578, 2016.

U.S. Appl. No. 16/782,793, Jun. 15, 2022, Office Action.

U.S. Appl. No. 16/782,793, dated Dec. 22, 2022, Office Action.

U.S. Appl. No. 16/782,793, dated Apr. 18, 2023, Notice of Allowance.

* cited by examiner

1  Initialise Network Structure: $\mathcal{F}$, Network Weights: $W$, Relative Weighting: $\lambda$, Learning rate: $\alpha$
2  while *not converged* do
3    if *in pruning stage* then
4      Compute Loss: $\mathcal{L}_{tot} = \sum_{(x,y)} \mathcal{L}(\mathcal{F}(x, W), y) + \lambda \sum_{\gamma \in \Gamma} |\gamma|$.
5      Update network weights: $w \leftarrow w - \alpha \nabla_w \mathcal{L}_{tot}$.
6      Update network structure $\mathcal{F}$ by removing channels if in pruning condition.
7    else
8      Compute Loss: $\mathcal{L}_{tot} = \sum_{(x,y)} \mathcal{L}(\mathcal{F}(x, W), y)$.
9      Update network weights: $w \leftarrow w - \alpha \nabla_w \mathcal{L}_{tot}$.
10   end
11 end

| Target Dataset | VGG-19 [20.23M] | | | VGG-19 Pr. 60% [3.35M] | | | |
|---|---|---|---|---|---|---|---|
| | fr. sc. | pre. tr. | heur (fr. sc.) | one-shot (fr. sc.) | one-shot (pre. tr.) | prog (fr. sc.) | prog (pre. tr.) |
| CIFAR-10 | 94.38 | 93.82 | 92.28 | 94.04 | 94.06 | 93.92 | 93.85 |
| CIFAR-100 | 70.63 | 72.74 | 68.12 | 63.43 | 67.49 | 67.06 | 69.02 |
| Aircraft | 39.71 | 50.72 | 39.23 | 39.02 | 47.20 | 39.07 | 49.54 |
| UCF101 | 71.48 | 78.42 | 67.24 | 66.50 | 72.31 | 70.26 | 78.22 |

340 →

| Target Dataset | VGG-19 [20.23M] | | | VGG-19 Pr. 70% [1.6M] | | | |
|---|---|---|---|---|---|---|---|
| | fr. sc. | pre. tr. | heur (fr. sc.) | one-shot (fr. sc.) | one-shot (pre. tr.) | prog (fr. sc.) | prog (pre. tr.) |
| CIFAR-10 | 94.38 | 93.82 | 90.95 | 93.90 | 93.56 | 94.13 | 93.56 |
| CIFAR-100 | 70.63 | 72.74 | 66.61 | 56.35 | 58.47 | 64.50 | 66.98 |
| Aircraft | 39.71 | 50.72 | 40.25 | 38.71 | 47.48 | 39.47 | 48.52 |
| UCF101 | 71.48 | 78.42 | 67.58 | 60.16 | 63.33 | 69.58 | 75.73 |

*Fig. 3D*

| Target Dataset | VGG-19 [20.23M] | | VGG-19, t = 0.05 | | VGG-19, t = 0.1 | |
| --- | --- | --- | --- | --- | --- | --- |
| | from scratch | pre-trained | from scratch | pre-trained | from scratch | pre-trained |
| CIFAR-10 | 94.38 | 93.82 | 94.08 [3.93M] | 93.48 [3.39M] | 93.82 [2.06M] | 93.76 [1.75M] |
| CIFAR-100 | 70.63 | 72.74 | 70.13 [18.0M] | 71.55 [16.8M] | 68.85 [12.7M] | 70.87 [11.7M] |
| Aircraft | 39.71 | 50.72 | 38.88 [20.3M] | 53.60 [18.3M] | 40.38 [20.3M] | 53.42 [16.9M] |
| UCF101 | 71.48 | 78.42 | 68.80 [6.52M] | 68.85 [3.62M] | 64.79 [3.30M] | 68.80 [2.93M] |

|  | | Layer Pruning [ResNet-101] | |
| --- | --- | --- | --- |
| Dataset | ResNet-101 [42.52M] | ×0.5 Prog. | ×0.25 Prog. |
| CIFAR-10 | 90.08 | 93.86 | 93.04 |
| CIFAR-100 | 58.54 | 68.18 | 67.70 |
| Aircraft | 23.37 | 36.80 | 34.14 |
| UCF101 | 61.82 | 76.32 | 75.73 |

*Fig. 4C*

NEURAL NETWORK ARCHITECTURE PRUNING

BACKGROUND

Recent years have seen significant advancement in hardware and software platforms that implement neural network models for processing digital data. In particular, many systems implement a neural network trained on a dataset to perform a particular task, such as classifying an object in a digital image. However, deep neural networks are often structurally large and require large amounts of computing resources and memory to generate, train, and operate. The structure and operations of deep neural networks are often decided by empirical choices that require significant expert knowledge. Though expert knowledge from a human designer is often used to select a neural network that can effectively perform a task, some conventional systems incorporate automated machine learning (AutoML) to alleviate the some of the need for human efforts. For example, using a neural network architecture search (NAS) approach, an automated machine learning system can automatically discover optimal operations in a given fixed architecture. Despite these advances, however, conventional automated machine learning systems suffer from several technological shortcomings that result in inflexible, inefficient, and inaccurate operation.

To illustrate, many existing solutions are inefficient. For example, existing solutions that rely on architecture search, which attempts to discover neural network architecture in an automated manner, require extensive computational power. For instance, architecture search solutions often require the use of computational resources (e.g., processing power and run-time memory) equivalent to training several neural networks simultaneously. Because of the large amounts of computational resources required, this solution precludes operation on mobile devices, such as smartphones, wearable devices, tablets, and other internet-connected devices.

Additionally, conventional automated machine learning systems are often inflexible in that they fail to adapt a neural network to different tasks. To illustrate, while some conventional systems can utilize the NAS approach to learn operations to perform within a neural network, such systems rigidly design the neural network for a single task. Accordingly, such systems are often incapable of adapting the design of the neural network for other tasks. Moreover, while the particular operations are learned, the neural network architecture itself is typically fixed. Indeed, such conventional systems often rely on an architecture that has been previously selected for the desired task. Thus, these conventional systems fail to flexibly adapt the structure of the neural network where needed to perform the task more effectively. As a further matter, such conventional systems are inflexible in that they typically continue to rely on human efforts to select the fixed architecture (e.g., the number of included layers, the number of filters in each layer, etc.).

In addition to flexibility concerns, conventional automated machine learning systems can also operate inaccurately. To illustrate, conventional systems utilizing an NAS approach are still prone to human error as they rely on human-designed neural network architectures, which may be sub-optimal for a given task. Accordingly, the outputs of these neural networks can contain inaccuracies with respect to the task.

Accordingly, these, along with additional problems and issues exist in existing solutions with respect to the technical field of automated machine learning.

BRIEF SUMMARY

Implementations of the present disclosure provide benefits and/or solve one or more of the foregoing or other problems in the art with systems, non-transitory computer-readable media, and methods that provide a technical improvement over existing systems by accurately and efficiently utilizing automated neural network architecture pruning. For example, the disclosed systems utilize progressive machine-learning and pruning techniques to reduce the size of neural networks while improving or maintaining the accuracy of the neural network. Indeed, the disclosed systems directly and automatically morph the structure of a neural network through progressively training and updating the architecture of the neural network. Additionally, in one or more implementations, the disclosed systems optimize a neural network for size, such as being able to fit on a mobile computing device with hardware restrictions. In some implementations, the disclosed systems optimize a neural network for relevance, such as reducing the size of the neural network as much as possible without materially sacrificing quality, accuracy, or performance.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIG. 3C illustrates an example of a progressive pruning algorithm based on a relative condition pruning parameter according to one or more implementations.

FIGS. 3D-3E illustrate comparative results illustrating some of the advantages of channel pruning in accordance with one or more implementations described herein.

FIG. 4C illustrate comparative results illustrating some of the advantages of layer pruning in accordance with one or more implementations described herein.

DETAILED DESCRIPTION

Figure 1:
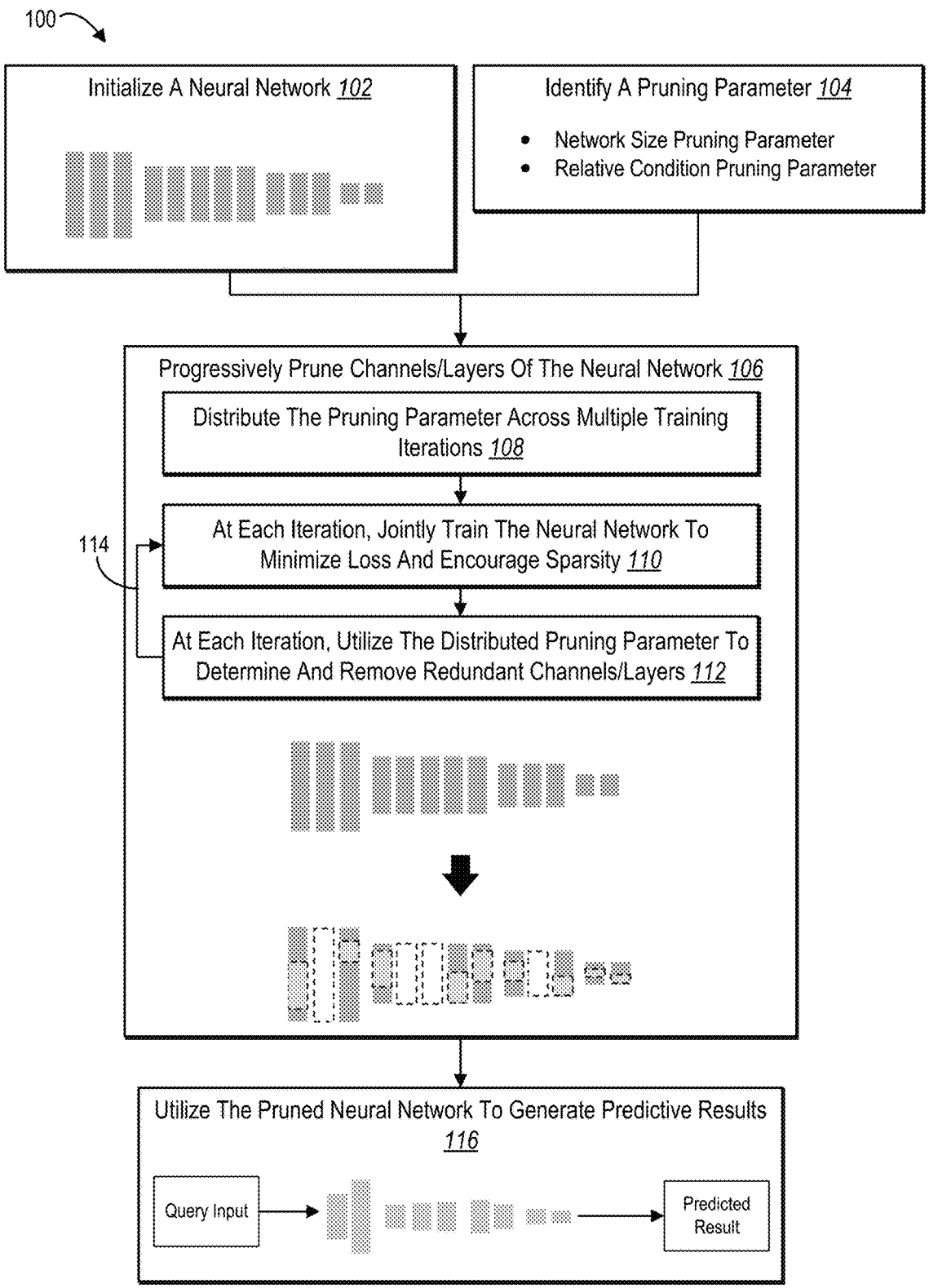
FIG. 1 illustrates an overview diagram of progressively pruning a neural network in accordance with one or more implementations.

This disclosure describes one or more implementations of a neural network architecture pruning system that automatically and progressively prunes neural networks. For instance, the neural network architecture pruning system (or simply "neural network pruning system") can automatically reduce the size of a neural network without reducing the accuracy of the neural network. For example, the neural network pruning system trains a neural network while progressively pruning subsets of the neural network at each training iteration. The neural network pruning system reduces the size of the neural network by progressively removing excess or redundant portions (e.g., channels or layers) of the neural network without materially sacrificing accuracy. Further, by removing portions of a neural network, the neural network pruning system can increase the efficiency of the neural network.

To illustrate, in one or more implementations, the neural network pruning system can initialize a convolutional neural network that includes multiple layers (i.e., batch-normalization layers) and multiple network weights. Next, the neural network pruning system can prune the convolutional neural network based on a pruning parameter across multiple iterations while jointly learning the neural network weights and scaling parameters. In particular, the neural network pruning system can iteratively update the neural network weights and scaling parameters for each portion (e.g., channel or layer) of the neural network, determine portions of the neural network that generate a scaling parameter not satisfying the pruning parameter, and modify the architecture of the neural network by removing the determined portions.

As mentioned above, the neural network pruning system can utilize pruning parameters to progressively prune a convolutional neural network (or simply "neural network"). In some implementations, the pruning parameter is network size pruning parameter. For example, a network size pruning parameter can indicate the desired size of the neural network after progressively pruning. In another example, the network size pruning parameter can indicate an amount or percentage of a neural network to prune away. In some alternative implementations, the pruning parameter is a relative condition pruning parameter (or simply "relative parameter"). For example, the relative parameter indicates a pruning sensitivity ratio or a threshold relevance condition for one or more portions of the neural network, as further described below.

In various implementations, the neural network pruning system can progressively prune a neural network until one or more training conditions are satisfied. For example, the neural network pruning system can jointly train and prune a neural network for a set number of iterations or for a set time amount. In another example, the neural network pruning system can jointly train and prune a neural network until the neural network converges and/or a minimum amount of network loss is achieved.

Further, the neural network pruning system can iteratively train and prune a convolutional neural network. For example, as described below, the neural network pruning system can jointly learn network weights and scaling parameters for each portion (e.g., layers or channels within those layers) of the neural network, determine a total loss, and back-propagate the loss to reduce total loss in the next iteration. Indeed, as part of the training, the neural network pruning system can penalize non-zero scaling parameters and/or encourage sparseness around the scaling parameters such that non-impactful portions (e.g., layers or channels) are pruned out. Further, as a benefit of the pruning process, the neural network pruning system need not additionally fine-tune the neural network after pruning.

In addition, in various implementations, the neural network pruning system can prune the neural network by comparing the scaling parameter of each network portion (e.g., layer or channel) to a given pruning parameter. In some implementations, the neural network pruning system can remove one or more portions associated with the lowest scaling parameters after a training iteration. Additional detail and example for pruning and removing portions of the neural network are provided below.

In one or more implementations, the neural network pruning system distributes and/or divides the pruning parameter across multiple training iterations. For example, in the case of a network size pruning parameter, the neural network pruning system can divide the pruning parameter based on the number of iterations (e.g., epochs) and apply the divided pruning parameter to each iteration. In alternative examples, the neural network pruning system can apply a default pruning value or range until the size of the neural network satisfies the pruning parameter (e.g., the network size pruning parameter).

In various implementations, the neural network pruning system can apply progressive pruning to pre-trained neural networks. Indeed, the neural network pruning system can apply transfer learning to train a pre-trained neural network for a different task and/or a different dataset. Additionally, the neural network pruning system can progressively train a new neural network from scratch. Accordingly, in many implementations, the neural network pruning system can gradually and automatically prune and morph a deep and wide neural network into a shallow and thin neural network that is tailored to a particular task and dataset while also maintaining overall accuracy and increasing efficiency.

As previously mentioned, the neural network pruning system can provide numerous advantages and benefits over existing systems via a practical application (e.g., progressively pruning new and pre-trained neural networks). In particular, the neural network pruning system can generate condensed neural networks, and thereby increase the efficiency of computing devices implementing them, while yielding comparable results as non-pruned neural networks. Indeed, the neural network pruning system can generate pruned neural networks in a manner that does not require extensive computational power to automatically learn the structure on the neural network. Further, the neural networking system can prune a neural network tailored to a particular dataset to maximize the effectiveness of the neural network during operation.

As mentioned above, the neural network pruning system can reduce the size of a neural network. In many implementations, the neural network pruning system can reduce the neural network to a desired size or optimization level. Indeed, the neural network pruning system can reduce the size of a large neural network to fit on a mobile client device or another hardware-limited device. In addition to generating compact neural networks that produce accurate results, the neural network pruning system generates neural networks that require less processing and real-time memory to operate. Moreover, the neural network pruning system can automatically learn and reduce the size of a neural network with little to no user interaction (e.g., the user does not need to manually define the initial network architecture).

More specifically, with respect to accuracy of operation, neural networks that are automatically pruned by the neural network pruning system maintain their level of accuracy with their larger unpruned counterparts. In addition, by progressively pruning a neural network across a number of iterations, the resulting pruned neural network is more robust. Further, performance fluctuations are significantly reduced. Moreover, in some cases, a pruned neural network produces more accurate results as redundant and less impactful portions (e.g., layers or channels) of the neural network are removed. As described in greater detail below, tables shown in FIGS. 3D, 3E, and 4C show empirical results comparing neural networks automatically pruned by the neural network pruning system with other existing systems.

Additionally, the neural network pruning system can provide improved flexibility over existing systems. For instance, the neural network pruning system facilitates transfer learning of a neural network. Indeed, the neural network pruning system can flexibly train both a neural network from scratch as well as a previously-trained neural network. Moreover, the neural network pruning system can flexibly prune a neural network based on one or more pruning parameters empirically learned or indicated by a user.

As illustrated by the foregoing discussion, the present disclosure utilizes a variety of terms to describe features and advantages of the neural network architecture pruning system (e.g., neural network pruning system). To illustrate, as used herein, the term "machine-learning model" refers to a computer representation that can be tuned (e.g., trained) based on inputs to approximate unknown functions. In particular, a machine-learning model can include a model that utilizes algorithms to learn from, and make predictions on, known data by analyzing the known data to learn to generate outputs that reflect patterns and attributes of the known data. The term machine-learning model can include linear regression models, logistical regression models, random forest models, support vector machines (SVG) models, neural networks, or decision tree models. Thus, a machine-learning model can make high-level abstractions in data by generating data-driven predictions or decisions from the known input data.

As used herein, the term "neural network" refers to a machine learning model that includes interconnected artificial neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a residual learning neural network, a recurrent neural network (RNN), a generative adversarial neural network (GAN), a graph neural network (e.g., a graph convolutional neural network), a Region-CNN (R-CNN), a Faster R-CNN, a Mask R-CNN, single-shot detect (SSD) networks, etc.

As used herein, the term "neural network portion" (or simply "portion") refers to either one or more layers of a neural network (e.g., a batch-normalization layer) or one or more channels within a layer. More particularly, a neural network can include various layers. For example, a CNN can include an input layer, hidden layers (e.g., pooling layers, fully connected layers, and normalization layers), and an output layer. In some implementations, the normalization layers are trainable batch-normalization layers. One or more of the layers (e.g., batch-normalization convolutional layers) can be made up of one or more layer channels (or neurons).

In addition, a neural network can include various "network weights." For instance, each neuron (i.e., channel) can compute an output value by applying a function to values provided as inputs, where the function is determined by network weights. Through training (e.g., backpropagation), the neural network can tune and learn optimal network weights to enable the neural network to output accurate predictions.

As used herein, the term "joint learning" refers to a machine-learning algorithm where multiple learning models are solved together. In particular, the term "joint learning" includes solving a plurality of learning tasks at the same time while utilizing the roles and constraints across the tasks. For instance, the neural network pruning system can minimize multiple loss models simultaneously as part of a joint learning framework. For example, the neural network pruning system can jointly learn the neural network weights and corresponding scaling parameters.

The term "scaling parameter," as used herein refers to an effectiveness indication with respect to the output by a neural network portion. For example, a higher scaling parameter indicates that the neural network portion (e.g., channel or layer) outputs information and/or network features that are efficiently used by the next neural network layer or otherwise affect the output of the neural network. Likewise, a low scaling parameter indicates that the neural network portion outputs redundant or less useful information and/or network features. The neural network pruning system can remove or prune out neural network portions having low scaling parameters. In many implementations, scaling parameters are jointly learned with the neural network weights. In various implementations, the neural network pruning system imposes a regularization penalty on scaling parameters to encourage scaling parameters to reduce to zero, which leads to network sparseness.

As further detailed below, in implementations where the neural network pruning system is pruning channels of a neural network (i.e., the neural network portion), the scaling parameter can be a channel scaling parameter represented as gamma (i.e., $\gamma$). Additionally, in implementations where the neural network pruning system is pruning layers of a neural network, the scaling parameter can be a layer scaling parameter represented as alpha (i.e., $\alpha$). Examples of channel scaling parameters and layer scaling parameters are provided below.

As used herein, the term "pruning parameter" refers to a factor indicating how to prune a neural network. For instance, a pruning parameter can correspond to a network size pruning parameter (or simply "size parameter") that indicates a size of the pruned neural network. For example, the size parameter can indicate an amount to remove from the neural network or the final size of the neural network. In another instance, the pruning parameter can correspond to a relative condition pruning parameter (or simply "relative parameter"). For instance, the relative condition pruning parameter can indicate a pruning sensitivity ratio/rate or a threshold relevance condition for one or more portions of the neural network. In most implementations, this pruning parameter is relative as it is based on relationships between corresponding portions of the neural network during training. Indeed, as further described below, the importance of a value for an attribute of one portion of the neural network is relative to the value of a corresponding attribute of another portion of the neural network.

As mentioned above, the neural network pruning system prunes neural networks. As used herein, the term "prune" refers to removing neural network portions (e.g., channels or layers) from a neural network to reduce the size of the neural network. In various implementations, pruning includes removing neural network portions by eliminating connections, and in some instances, re-connecting incoming connections of a neural network portion with existing outgoing connections of the neural network portion (e.g., skip-connections).

Referring now to the figures, FIG. 1 illustrates an overview diagram of progressively pruning a neural network in accordance with one or more implementations. As shown, FIG. 1 includes a series of acts 100 of the neural network pruning system pruning a neural network. As shown, the series of acts 100 includes an act 102 of the neural network pruning system initializing a neural network. For example, the neural network pruning system downloads, identifies, builds, loads, generates, organizes, or otherwise prepares a neural network. In various implementations, the neural network is a convolutional neural network having batch-normalization layers. Moreover, in many implementations, the neural network is previously trained to perform a first task or based on a first dataset and the neural network pruning system is pruning and turning the neural network to perform a second task and/or more efficiently process a second dataset.

In addition, as shown, the series of acts 100 includes an act 104 of the neural network pruning system identifying a pruning parameter. In one or more implementations, the pruning parameter is a network size pruning parameter (or simply "size parameter") that indicates a specified desired size of the pruned neural network, as defined above. In alternative implementations, the pruning parameter is a relative condition pruning parameter (or simply "relative parameter") that indicates a relevance threshold for portions of the pruned neural network, as defined above. In addition, examples of the size parameter and the relevance parameter are provided below in connection with FIG. 2

As shown, the series of acts 100 can include an act 106 of the neural network pruning system progressively pruning the channels and/or layers (i.e., portions) of the neural network. More particularly, the act 106 can include multiple sub-acts. To illustrate, the act 106 includes a first sub-act 108 of the neural network pruning system distributing the pruning parameter across multiple training iterations. For example, in the case of the size parameter, the neural network pruning system can divide the pruning parameter based on the number of training iterations and apply (i.e., distribute) each divided pruning parameter to each iteration. In the case of the relative parameter, the neural network pruning system can apply (i.e., distribute) the pruning parameter across multiple training iterations.

Additionally, the act 106 includes the sub-act 110 of the neural network pruning system, at each iteration, jointly training the neural network to minimize loss and encourage sparsity. For instance, the neural network pruning system can tune the neural network weights to minimize a loss. Simultaneously, the neural network pruning system can add a scaling parameter to each channel and layer and jointly train the scaling parameter to be sparse when the channel or layer is inactive (e.g., not passing forward meaningful information).

Furthermore, the act 106 includes the sub-act 112 of the neural network pruning system, at each iteration, utilizing the distributed pruning parameter to determine and remove redundant (e.g., inactive) channels and/or layers. For example, in one or more implementations, the neural network pruning system analyzes the scaling parameter (e.g., a channel and/or a layer scaling parameter) associated with each portion of the neural network and determines whether the scaling parameter satisfies the pruning parameter. If the scaling parameter does not satisfy the pruning parameter, then the neural network pruning system can remove the neural network portion (e.g., the channel and/or layer).

Further, as shown, as part of the act 106, the neural network pruning system includes the sub-act 114 of repeating sub-acts 110 and 112. In one example, the neural network pruning system repeats the sub-acts 110 and 112 until the neural network converges. In another example, the neural network pruning system repeats the sub-acts 110 and 112 until a set number of iterations elapses.

As illustrated in connection with the act 106, the neural network pruning system can prune the neural network by removing layers and portions of layers (e.g., channels). Additional detail regarding pruning channels (e.g., neurons) within neural network layers is provided in connection with FIGS. 3A-3E. Additional detail regarding pruning neural network layers is provided in connection with FIGS. 4A-4C.

As shown in FIG. 1, the series of acts 100 includes the act 116 of the neural network pruning system utilizing the pruned neural network to generate a predictive result. For example, in various implementations, the neural network pruning system provides a query input to the pruned neural network, which processes the input, and outputs a predicted result. As previously mentioned, the pruned neural network can be tuned and trained to perform a wide variety of tasks.

Figure 2:
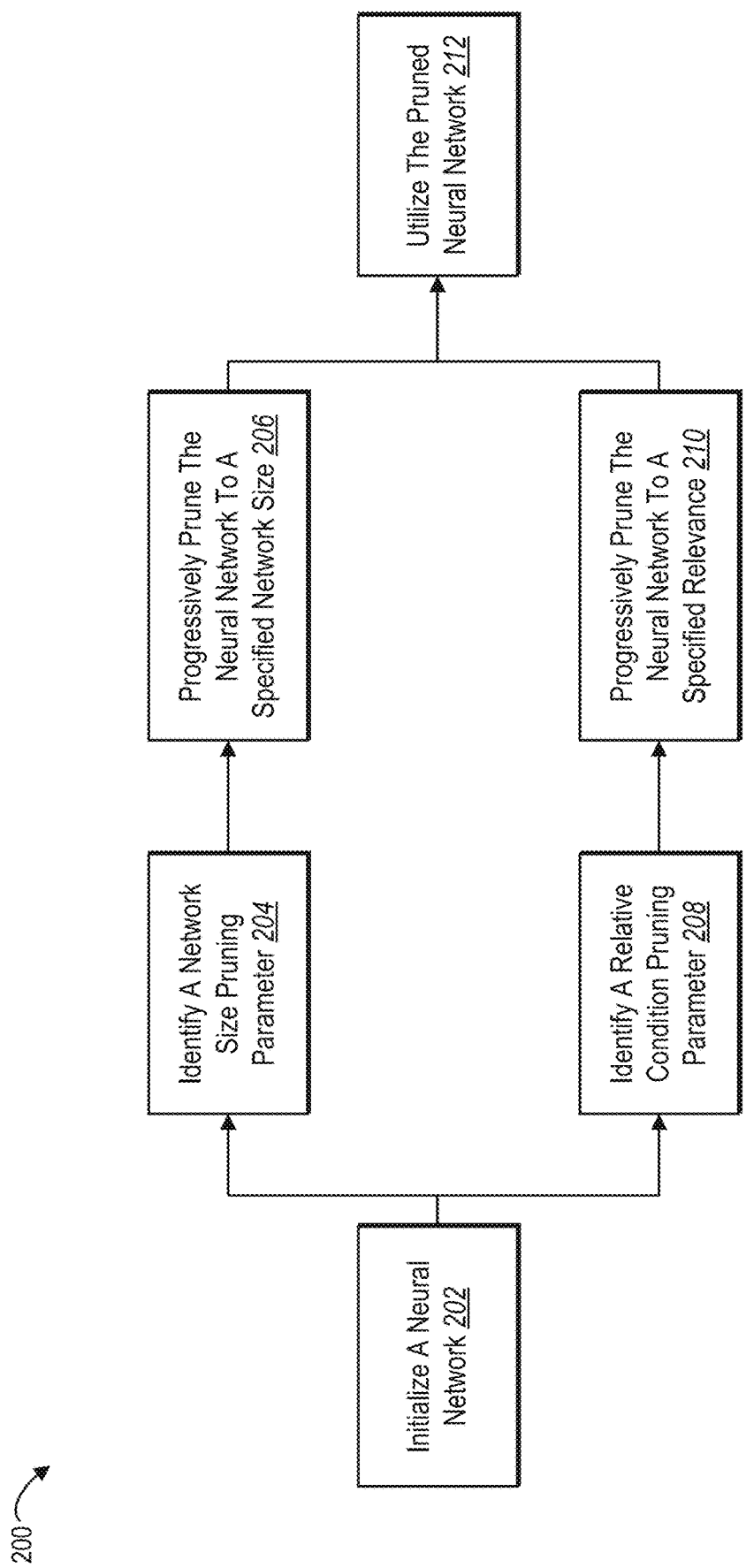
FIG. 2 illustrates a flow diagram of progressively pruning a neural network based on different pruning parameters in accordance with one or more implementations.

As mentioned above, FIG. 2 and the accompanying description corresponds to pruning a neural network based on different pruning parameters. For instance, FIG. 2 illustrates a flow diagram of progressively pruning a neural network based on a size parameter or a relevance parameter in accordance with one or more implementations. To illustrate, FIG. 2 shows a flow diagram of a series of acts 200 of the neural network pruning system pruning a neural network based on either a size parameter or a relevance parameter.

As shown, the series of acts 200 includes the act 202 of the neural network pruning system initializing a neural network. As described above, the neural network pruning system can utilize a pre-trained neural network or train a new neural network from scratch. For example, the neural network pruning system identifies a neural network pre-trained for a first task and/or a first dataset. In this example, the neural network pruning system can progressively prune the neural network while training the neural network for a second task and/or a second dataset (e.g., transfer learning).

As mentioned above, the neural network pruning system can prune the neural network based on a pruning parameter, which can include a network size pruning parameter (or simply "size parameter") or a relative condition pruning parameter (or simply "relative parameter"). To illustrate, the series of acts 200 includes an act 204 of the neural network pruning system identifying a network size pruning parameter.

As noted above, the size parameter can correspond to a final size of the neural network after pruning. Often, the size parameter can directly indicate the final size of a neural network such as reducing the size of the neural network to "x" gigabytes or to 30% of the original size. In some cases, the size parameter can indirectly indicate the final size of the neural network by indicating an amount to reduce the neural network when pruning. For example, the size parameter indicates a 60% reduction in size or reducing the neural network by 1.3 gigabytes.

The neural network pruning system can identify the size parameter in a variety of ways. For example, in one or more implementations, the size parameter is based on a default value (e.g., reduce the neural network by 30%, 50%, 70%, 90%). In some implementations, the size parameter is based on the hardware constraints of a computing device. For instance, when pruning a neural network to be implemented on a particular computing device (e.g., a mobile client device), the neural network pruning system can identify the size parameter based on the memory capacity and/or availability of the computing device. In various implementations, the size parameter is provided via user input. For instance, the neural network pruning system receives user input indicating the size parameter and/or other tuning parameters to apply when pruning the neural network.

As shown, the series of acts 200 includes the act 206 of the neural network pruning system progressively pruning the neural network to a specified network size. In one or more implementations, the neural network pruning system prunes the neural network across multiple training iterations until the size indicated by the size parameter is satisfied. As detailed below, the neural network pruning system can prune out portions of the neural network by comparing corresponding scaling parameters (e.g., channel and/or a layer scaling parameters) to determine the activity of each portion and to remove one or more portions until the size parameter is satisfied.

To illustrate, in one or more implementations, the neural network pruning system determines or otherwise identifies a number of training iterations (e.g., epochs). Based on the number of training iterations, the neural network pruning system divides up the size parameter. More specifically, the neural network pruning system utilizes the size parameter to determine a reduction amount by subtracting the final neural network size of the neural network from the original size of the neural network. Then, the neural network pruning system divides the reduction amount by the number of training iterations to determine the amount to reduce the neural network at each iteration to reach the final neural network size. Further, the neural network pruning system prunes out inactive portions at each iteration to the satisfaction of the divided size parameter (e.g., for each iteration, the neural network pruning system removes the two layers having the lowest layer scaling parameter values).

By way of a numerical example, suppose the original neural network is 80 gigabytes and the size parameter indicates a final size of 20 gigabytes. Additionally, suppose the neural network pruning system trains for 100 training iterations. Here, the neural network pruning system determines a network size reduction amount of 60 gigabytes (i.e., 80 GB–20 GB=60 GB). Further, the neural network pruning system determines a reduction amount of 0.6 gigabytes per iteration (i.e., 60 GB/100 iterations=0.6 GB/iteration). Accordingly, by pruning 0.6 GB from the neural network at each training iteration (e.g., by removing portions having the lowest scaling parameter values per iteration), the neural network pruning system can reduce the neural network to the final neural network size of 20 GB.

In some implementations, the neural network pruning system can prune the neural network by a fixed amount at each iteration. For example, the neural network pruning system prunes the neural network by 1 GB at each iteration. The fixed amount can be a default amount or provided via user input or user preferences. In addition, in these implementations, the neural network pruning system can alter the number of training iterations to ensure that the final neural network size indicated by the size parameter is satisfied. Indeed, the neural network pruning system can train the neural network for at least a minimum number of iterations. In some implementations, the neural network pruning system can stop training once the final neural network size is achieved. Also, upon completing pruning, the neural network pruning system need not further fine-tune the neural network through additional training.

As another numerical example, supposing the numbers from the example above (e.g., the original neural network is 80 gigabytes and the size parameter indicates a final size of 20 gigabytes), the neural network pruning system can determine that at least 60 iterations are needed to achieve a final neural network size of 20 GB if 1 GB is pruned at each iteration (i.e., 60 GB/1 GB/iteration=60 iterations). Thus, the neural network pruning system can train and prune the neural network for at least 60 iterations, if not more.

In various implementations, the neural network pruning system can prune a neural network to within a tolerance or threshold amount of the final neural network size indicated by the size parameter. For example, the neural network pruning system can prune the neural network to within 5% or 20 GB (or other values) above and/or below the final neural network size. In some implementations, the neural network pruning system can utilize a tolerance to prune the neural network at each iteration. For example, the neural network pruning system prunes 1 GB/iteration±0.5 GB. In these implementations, to account for the pruning size variability at each iteration, the neural network pruning system may need to train and prune the neural network with more or fewer training iterations to achieve the final neural network size indicated by the size parameter.

As mentioned above, in various implementations, the pruning parameter can be a relative parameter. To illustrate, the series of acts 200 includes an act 208 of the neural network pruning system identifying a relative condition pruning parameter. As with the size parameter, the relative parameter can be a default value or based on user input. For example, the relative parameter can be a preference that is adjustable by the user.

As noted above, the relative parameter can correspond to a threshold relevance condition for one or more portions (e.g., channels and/or layers) of the neural network. For instance, the value for an attribute (e.g., scaling parameter) of one portion of the neural network is relative to the value of a corresponding portion of the neural network. For example, the relative parameter indicates which portions of the neural network to remove relative to the portion having the highest value (e.g., the portion having the maximum scaling parameter) for the same training iteration.

As shown, the series of acts 200 includes an act 210 of the neural network pruning system progressively pruning the neural network to a specified relevance. For example, the neural network pruning system prunes the neural network for a pre-determined amount, such as a set number of iterations, a set time, or until the neural network converges. At each training iteration, the neural network pruning system determines the scaling parameter (e.g., a channel and/or a layer scaling parameter) for each portion, including the maximum scaling parameter value. Based on the maximum scaling parameter value, the neural network pruning system determines if any other portion of the neural network does not satisfy the relative parameter. If yes, the neural network pruning system prunes that portion. Otherwise, the neural network pruning system continues jointly training the neural network weights and scaling parameter for each portion at the next iteration.

By way of example, suppose that the neural network pruning system identifies a relative parameter of 10%. At each training iteration, the neural network pruning system determines if any portions have a scaling parameter value less than 10% of the highest scaling parameter value. Upon pruning the portions that did not satisfy the relative parameter, the neural network pruning system continues to the next iteration until training is complete. Thus, the neural network pruning system may prune a large number of portions for one iteration, a small number of portions for another iteration, and no portions for another iteration. In this manner, the neural network pruning system can remove low activity portions of the neural network without over-pruning the neural network.

In one or more implementations, the relative parameter can be represented as t. In these implementations, determining which portions for the neural network pruning system to prune can be represented as shown in Equations 1 and 2 below:

$$\gamma < t \times \max(\Gamma) \quad (1)$$

In Equation 1, $\gamma$ represents the channel scaling parameter value for each channel, t represents the relative parameter, and $\max(\Gamma)$ represents the channel having the highest scaling parameter value among all of the channels in a training iteration.

$$\alpha < t \times \max(A) \quad (2)$$

In Equation 2, a represents the layer scaling parameter value for each layer, t represents the relative parameter, and max(A) represents the layer having the highest scaling parameter value among all of the layers in a training iteration.

As mentioned above, the neural network pruning system jointly trains the scaling parameter (e.g., the channel scaling parameter $\gamma$ or the layer scaling parameter $\alpha$) along with the network weights to indicate the activity of a given portion (e.g., channel or layer). In this manner, less-active portions will have lower scaling parameter values while active portions (e.g., portions that output a high level of useful information) will have larger scaling parameter values. Accordingly, as shown in Equations 1 and 2, the neural network pruning system can prune out portions of the neural network that have a scaling parameter value less than a relative condition value determined by multiplying the relative parameter and the maximum scaling parameter value.

While the relative parameter is relative to the maximum scaling parameter value in the example above, in alternative implementations, the relative parameter can be relative to other values. For example, the relative parameter is relative to the top quarter or half of the scaling parameter values. In some implementations, the relative parameter is based on a non-linear relation to other portions. In various implementations, the relative parameter is not based on the value of scaling parameters, but based on another attribute.

In some implementations, the relative parameter is based on a minimum threshold value. For example, the relative parameter is provided via user input, learned empirically, or a default value. When pruning portions of the neural network, the neural network pruning system determines if any portions have a scaling parameter (or other attribute value) below the relative parameter. For instance, if the relative parameter 0.3, then the neural network pruning system removes each portion having a scaling parameter below 0.3 for a given iteration. If none of the portions have a scaling parameter below 0.3 for the given iteration, the neural network pruning system does not remove any portions for the given iteration and continues to the next iteration.

As shown in FIG. 2, the acts 204-206 and the acts 208-210 are in separate paths. While the size parameter and the relative parameter are generally mutually exclusive, in some implementations, the neural network pruning system utilizes both or a combination of these pruning parameters. For example, the neural network pruning system alternates between applying the size parameter and the relative parameter, such as at every other iteration, first fully applies the relative parameter than fully applies the size parameter, or applies the two scaling parameters utilizing another combination.

Upon progressively pruning the neural network based on the identified pruning parameter, the neural network pruning system can utilize the pruned neural network, as shown as the act 212 within the series of acts 200. In some implementations, the act 212 can include the neural network pruning system providing a query input to the pruned neural network and predicting an output. In one or more implementations, the act 212 can include providing the pruned neural network to another computing device (e.g., a hardware-constrained mobile client device).

Figure 3A:
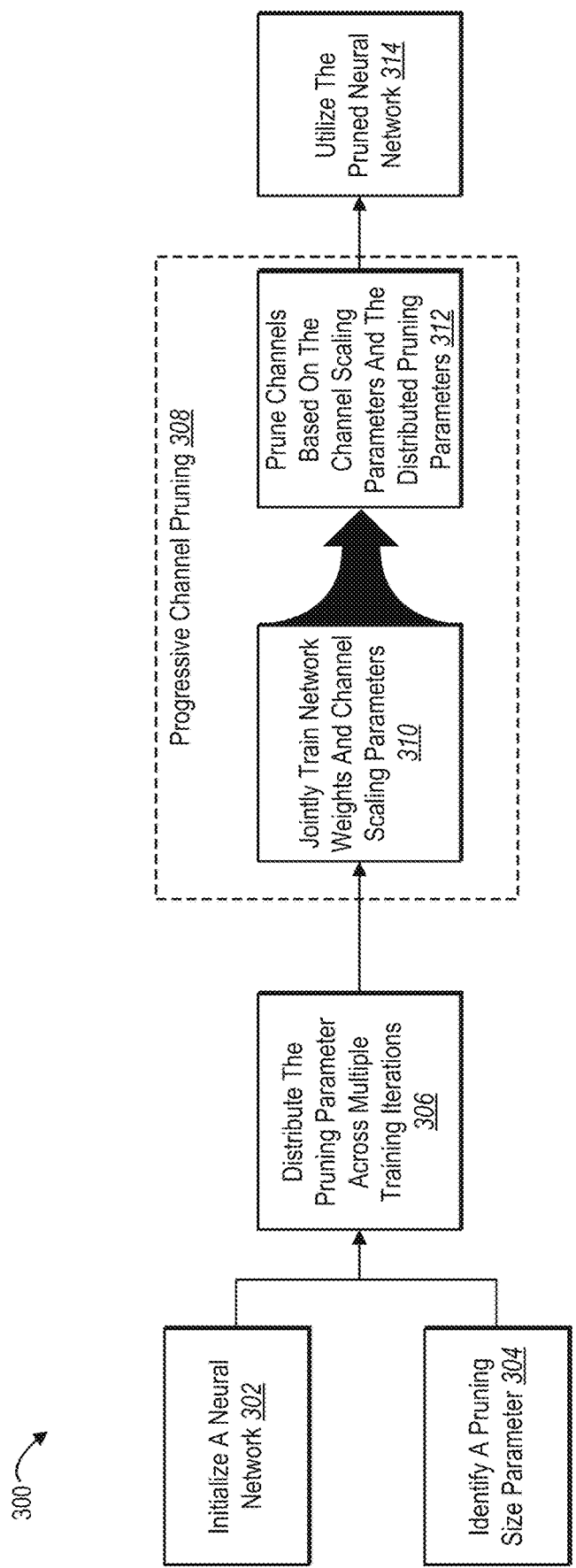
FIG. 3A illustrates a flow diagram for progressively pruning channels of a neural network in accordance with one or more implementations.

Turning now to FIGS. 3A-3E, additional disclosure is provided with regard to pruning channels of a neural network. To illustrate, FIG. 3A shows a flow diagram for progressively pruning channels of a neural network in accordance with one or more implementations described herein. As provided above, channels of a neural network can correspond to channels (or neurons) within a layer of a neural network. For example, a neural network can include multiple batch-normalization layers, each layer having multiple channels.

In one or more implementations, channel pruning can include an algorithm to remove inactive or less active channels of a neural network by monitoring the channel scaling parameter (e.g., $\gamma$) in the batch-normalization layers. If the channel scaling parameter value is close to zero during a training iteration, mathematically that channel is not outputting an impactful level of information. Indeed, when the channel scaling parameter value is close to zero, the channel is inactive and removing the channel will have an insignificant effect on the final performance of the neural network.

As illustrated, FIG. 3A includes a series of acts 300 that the neural network pruning system can perform. As shown, the series of acts 300 includes an act 302 of the neural network pruning system initializing a neural network, which has been previously described. As also shown, the series of acts 300 includes an act 304 of the neural network pruning system identifying a pruning parameter. For example, as described previously in connection with FIG. 2, the neural network pruning system can identify a size parameter or a relative parameter.

As shown, the series of acts 300 includes an act 306 of the neural network pruning system distributing the pruning parameter across multiple training iterations. For example, if the pruning parameter is a size parameter, the neural network pruning system can divide the parameter based on the number of training iterations and distribute the divided size parameter to each iteration, as explained above. As another example, if the pruning parameter is a relative parameter, the neural network pruning system can distribute the parameter to each iteration, to be applied based on the relative channel scaling parameter values at each iteration, as explained previously.

As shown, FIG. 3A includes the neural network pruning system utilizing progressive channel pruning 308 to perform the series of acts 300. In particular, progressive channel pruning 308 can include an act 310 of the neural network pruning system jointly training the network weights and channel scaling parameters. In one or more implementations, the act 310 can include the neural network pruning system training the neural network weights to perform a given task (e.g., classification). In addition, the act 310 can include the neural network pruning system concurrently training channel scaling parameters associated with the channels to indicate activity levels of the channels for a given training iteration.

The act 310 can also include the neural network pruning system utilizing a loss function (e.g., a joint loss function) to jointly train the neural network weights and channel scaling parameters. For example, the loss function compares the output of the neural network to a ground truth (or other comparative measure) to determine an error amount (e.g., network loss). Further, the loss function can include a loss summation or loss mean from the channel scaling parameters (e.g., channel scaling factor loss). The neural network pruning system can backpropagate the combined loss to update the channel scaling parameters (e.g., by imposing a sparse penalty to encourage channel sparseness via the channel scaling parameters) and neural network weights.

To illustrate, the act 310 of jointly training the neural network can be represented mathematically as shown below in Equations 3 and 4.

$$\hat{z} = \frac{z_{in} - \mu_B}{\sqrt{\sigma_B^2 + \epsilon}}, z_{out} = \gamma \hat{z} + \beta \qquad (3)$$

As shown in Equation 3, $z_{in}$ and $z_{out}$ can represent the input and output of a batch-normalization layer, β can denote a current mini-batch and batch-normalization layer. Additionally, $\mu_B$ can represent the mean values of input activations over mini-batch β while $\sigma_B$ can represent the standard deviation values of input activations over mini-batch ft. Further, in some implementations, γ and β are trainable parameters, such as trainable affine transformation parameters. For example, γ and β represent scale and shift and enable the neural network pruning system to linearly transform normalized activations to different scales.

$$\mathcal{L}_{tot} = \sum_{(x,y)} \mathcal{L}(\mathcal{F}(x, W), y) + \lambda \sum_{\gamma \in \Gamma} |\gamma| \qquad (4)$$

In Equation 4, $L_{tot}$ represents the total loss of the first term (e.g., the network loss) and the second term (e.g., the channel scaling factor loss). In various implementations, in the first term, L(•) can represent the network loss function to a layer, F(•) can represent the current neural network structure, x can represent an input (e.g., feature values), W can represent trainable network weights, and γ can represent a corresponding ground truth (e.g., a ground truth classification label). Further, in the second term, λ can represent a tunable hyper-parameter that measures relative importance and weights to the channel scaling parameters (e.g., controls the tradeoff between classification loss and sparsity). Additionally, as mentioned above, γ can represent the channel scaling parameter of each channel. In some implementations, the |γ| term represents an L1-norm (e.g., L1 regularization).

In one or more implementations, by applying the algorithm shown in Equation 4 at each training iteration (e.g., progressively), the neural network pruning system can automatically learn and impose sparsity regularization (e.g., add a sparse penalty) for channel scaling parameters (i.e., γ) that are close to zero (e.g., γ≈0) along with the network loss during backpropagation. In this manner, the neural network pruning system can encourage the channel scaling parameters on less-active channels to be sparse when their channel scaling parameter value approaches zero. Furthermore, by progressively training the channels of the neural network, the neural network pruning system can add robustness to the neural network and significantly reduce performance fluctuations of the neural network compared to existing architecture pruning and compression solutions.

As shown, progressive channel pruning 308 can include an act 312 of the neural network pruning system pruning channels based on the channel scaling parameter and the distributed pruning parameter. For example, at each training iteration, after training each of the channels, the neural network pruning system can determine which channels to prune based on the pruning parameter. In this manner, the neural network pruning system can automatically identify and robustly remove insignificant channels across the multiple training iterations.

In one or more implementations, as part of utilizing the progressive channel pruning 308 to perform the series of acts 300, the neural network pruning system can repeat the acts 310 and 312 until the neural network is pruned and trained. For example, the neural network pruning system progressively trains and prunes the neural network for at least a set number of iterations and/or until the neural network converges. Notably, the neural network pruning system need not further fine-tune the neural network through additional training upon completing pruning the neural network. Indeed, by progressively pruning the neural network, the neural network pruning system automatically adds robustness to the pruned neural network without the need to fine-tune the pruned neural network.

As shown, the series of acts 300 includes an act 314 of the neural network pruning system utilizing the pruned neural network. As noted above, in some implementations, the act 314 includes the neural network pruning system utilizing the pruned neural network to obtain results generated by the neural network based on query inputs. In some implementations, the act 314 includes the neural network pruning system providing the pruned neural network to another computing device.

Figure 3B:
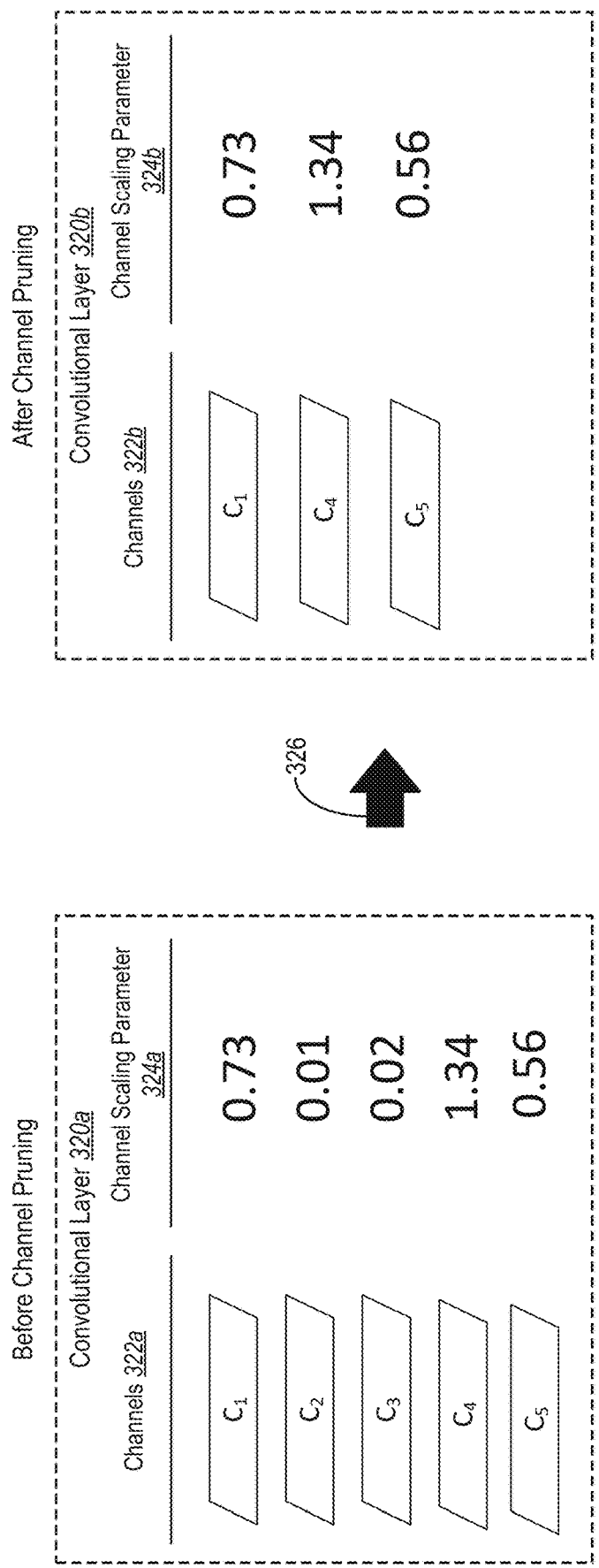
FIG. 3B illustrates a schematic diagram of a set of channels before and after pruning in accordance with one or more implementations.

FIG. 3B illustrates an example of channels within a layer of a neural network before and after pruning according to one or more implementations. In one or more implementations, FIG. 3B corresponds to the act 312, described above in connection with FIG. 3A, of the neural network pruning system pruning channels based on the channel scaling parameters and the distributed pruning parameters. To illustrate, FIG. 3B includes a convolutional layer 320a before channel pruning on the left and the convolutional layer 320b after channel pruning on the right.

As shown on the left, the pre-pruned convolutional layer 320a includes multiple channels 322a and corresponding channel scaling parameters 324a. For simplicity, each of the channels 322a is represented as a block (e.g., $C_1$-$C_5$); however, each channel can include a feature vector of one or more numbers (e.g., latent values) that indicate the neural network weights associated with its channel. Indeed, each of the channels 322a can contribute a network weight that the neural network pruning system utilizes to determine the network loss of the neural network, as described above with respect to Equation 4.

As mentioned above, the pre-pruned convolutional layer 320a shows the channel scaling parameter associated with each channel. As described previously, the neural network pruning system can jointly train the channel scaling parameters with the channels to indicate an activity level of the channel at each iteration. For example, the second and third channels (i.e., $C_2$ and $C_3$) have channel scaling parameters close to zero, indicating that these channels are not generating useful information for subsequent portions of the neural network.

As shown, the neural network pruning system can prune (i.e., act 326) the pre-pruned convolutional layer 320a based on the values of the channel scaling parameters 324a and the distributed pruning parameter. In particular, the neural network pruning system can identify and order (e.g., rank) each of the channel scaling parameters 324a. Further, the neural network pruning system can utilize the distributed pruning parameter to determine which, if any, of the channels to remove based on their corresponding channel scaling parameters. For example, based on a size parameter, the neural network pruning system determines to remove two channels for the given training iteration. As another example, based on a relative parameter, the neural network pruning system determines to remove all channels with a channel scaling parameter below 0.5.

Accordingly, as shown in FIG. 3B, the post-pruned convolutional layer 320b shows fewer channels channel 322b along with their corresponding channel scaling parameter 324b. More specifically, as part of pruning the convolutional channel, the neural network pruning system removes the second and third channels (i.e., $C_2$ and $C_3$) from the channels 322b as the second and third channels were removed based on not satisfying the distributed pruning parameter.

While FIG. 3B shows a single layer, the neural network pruning system can prune channels across the neural network at each training iteration. For example, the neural network pruning system compares the channel scaling parameter values across all of the convolutional layers at each iteration and prunes the channels having channel scaling parameter values that do not satisfy the distributed pruning parameter. Thus, in some cases, the neural network pruning system may remove multiple channels from a first layer and none from a second layer. Further, the neural network pruning system can repeat the channel pruning process at the next iteration after further training each of the channels that remain after pruning.

FIG. 3C illustrates an example of a progressive pruning algorithm based on a relative condition pruning parameter according to one or more implementations. In particular, FIG. 3C illustrates an example series of acts 328 (e.g., lines 1-11) that the neural network pruning system can perform to iteratively prune a neural network. As shown, the series of acts 328 includes the neural network pruning system initializing a neural network (e.g., line 1) having a network structure F, network weights W, relative weighing λ, and a learning rate a.

As shown in the series of acts 328, while the neural network is not converged, the neural network pruning system can train and progressively prune the neural network (e.g., lines 2-6). In particular, while in a pruning stage, the neural network pruning system can jointly train the neural network weights as well as the channel scaling parameter γ of each channel and then compute the total loss. To illustrate, line 4 of the series of acts 328 shows Equation 4 above.

Upon computing the total loss, the neural network pruning system can update the neural network weights (e.g., line 5), for example, via backpropagation. In addition, the neural network pruning system can prune out channels of the neural network that do not satisfy the relative parameter (e.g., line 6). As shown, the neural network pruning system can repeat this process for each of the iterations. Then, when the neural network pruning system is not in the pruning stage, the series of acts 328 can include the neural network pruning system computing the network loss of the neural network weights without the channel scaling parameters (e.g., line 8) and updating the neural network weights accordingly (e.g., line 9).

As mentioned previously, channel pruning implementations of the neural network pruning system disclosed herein have been found to at least maintain the accuracy of original neural networks as well as increase operational efficiency. Further, implementations of the neural network pruning system disclosed herein have been found to outperform existing solutions. To illustrate, FIG. 3D shows the results of researchers who compared channel pruning implementations of the neural network pruning system disclosed herein to other systems based on a network size pruning parameter. FIG. 3E shows the results of evaluating channel pruning implementations of the neural network pruning system with respect to the relative condition sensitivity pruning parameter.

In particular, FIG. 3D shows a first table 330 and a second table 340 that each includes results of the neural network pruning system utilizing progressive channel pruning compared to other systems. As shown, each table includes the evaluation of four models, which include the three baseline models and the neural network pruning system (i.e., "prog."). The baseline models include the original unpruned neural network (i.e., the first two columns) as well as two pruned versions, which include a heuristic model (i.e., "heur.") that is manually pruned by hand to uniformly remove channels from each layer (i.e., the column) and a one-shot (i.e., "one-shot") model that removes all channels in a single training iteration before fine-turning the pruned neural network (i.e., the next two columns). The details of the one-shot channel pruning model are described by Liu et al. in *Learning Efficient Convolutional Networks Through Network Slimming* from Proceedings of the IEEE International Conference on Computer Vision, pages 2736-2744, 2017.

Further, for each model (except the heuristic), the tables include a training-from-scratch evaluation (i.e., "fr. sc.") and a transfer-learning evaluation where the neural network is pre-trained with the same methodology (i.e., pre-trained or "pre. tr."). Additionally, each of the tables includes an evaluation across four datasets. For example, the datasets include CIFAR-10, CIFAR-100, Aircraft, and UFC101. For reference, CIFAR-10 and CIFAR-100 serve as small datasets while Aircraft and UFC101 are fine-grain large resolution datasets.

As shown in the tables, the baseline models are built on a visual geometry group neural network with 19 weight layers (i.e., "VGG-19"). Additionally, in the first table 330, the pruned neural network pruned 60% of the channels respectively (e.g., a size parameter of 60%) under the four datasets (i.e., "VGG-19 Pr. 60%"). Similarly, in the second table 340, the pruned neural network pruned 70% of the channels respectively (e.g., a size parameter of 70%) under the four datasets (i.e., "VGG-19 Pr. 70%"). Further, the number between the square brackets [•] represents the neural network parameter size (e.g., size of the neural network).

As shown in the first table 330 and the second table 340, the progressive channel pruning by the neural network pruning system (i.e., prog.) either outperforms or reaches similar performance results compared to other for both pruning ratios (e.g., from scratch or pre-trained). Indeed, the neural network pruning system (i.e., prog) performs at the same level as the larger non-pruned neural network. Further, the neural network pruning system is shown to outperform the other baseline models in various evaluations. For example, for the fine-grained classification datasets (e.g., Aircraft and UFC101), the neural network pruning system outperforms the one-shot pruning method by a significant margin, as shown in the first table 330 and the second table 340.

FIG. 3E shows a third table 350 where the researchers evaluated the neural network pruning system based on different relative condition pruning parameters (e.g., relative parameters). In particular, the third table 350 shows the original unpruned neural network in the first two columns and the neural network pruning system in the last four columns. The baseline neural network was trained as described above in connection with the first table 330 and the second table 340 (i.e., VGG-19). Further, the third table 350 includes the same four datasets (i.e., CIFAR-10, CIFAR-100, Aircraft, and UFC101).

As shown in the third table 350, the neural network pruning system imposes a relative parameter (e.g., pruning sensitivity ratio/rate) of 5% (i.e., 0.05) shown in the middle two columns and 10% (i.e., 0.1) shown in the last two columns. In this manner, the neural network pruning system progressively removes channels at each training iteration based on applying Equation 1 utilizing the relative parameter t of either 5% or 10%. As shown in the third table 350, the neural network pruning system can maintain the performance of the original neural network while being reduced to a smaller, optimal size, that is more efficient for a computing device to operate.

Furthermore, the researchers performed additional evaluations with respect to the neural network pruning system. For example, they evaluated whether the neural network pruning system could be generalized into a wider variety of tasks and different types of neural networks (e.g., encoder-decoder networks). While not illustrated, the researchers confirmed through empirical evaluation of various metrics (e.g., mean intersection of union and pixel accuracy) that the neural network pruning system provides consistent performance across different tasks and datasets. In particular, with respect to transfer learning, the neural network pruning system notably outperformed the other baseline models.

Figure 4A:
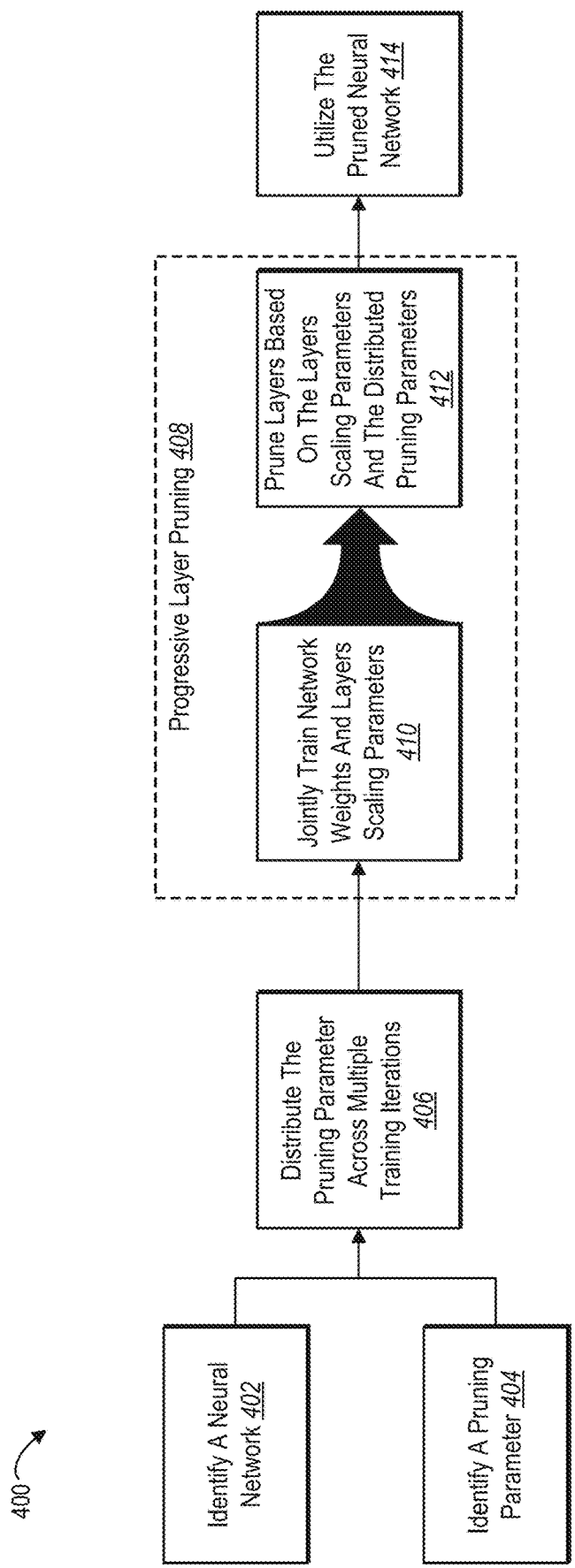
FIG. 4A illustrates a flow diagram for progressively pruning layers of a neural network in accordance with one or more implementations.
Figure 4B:
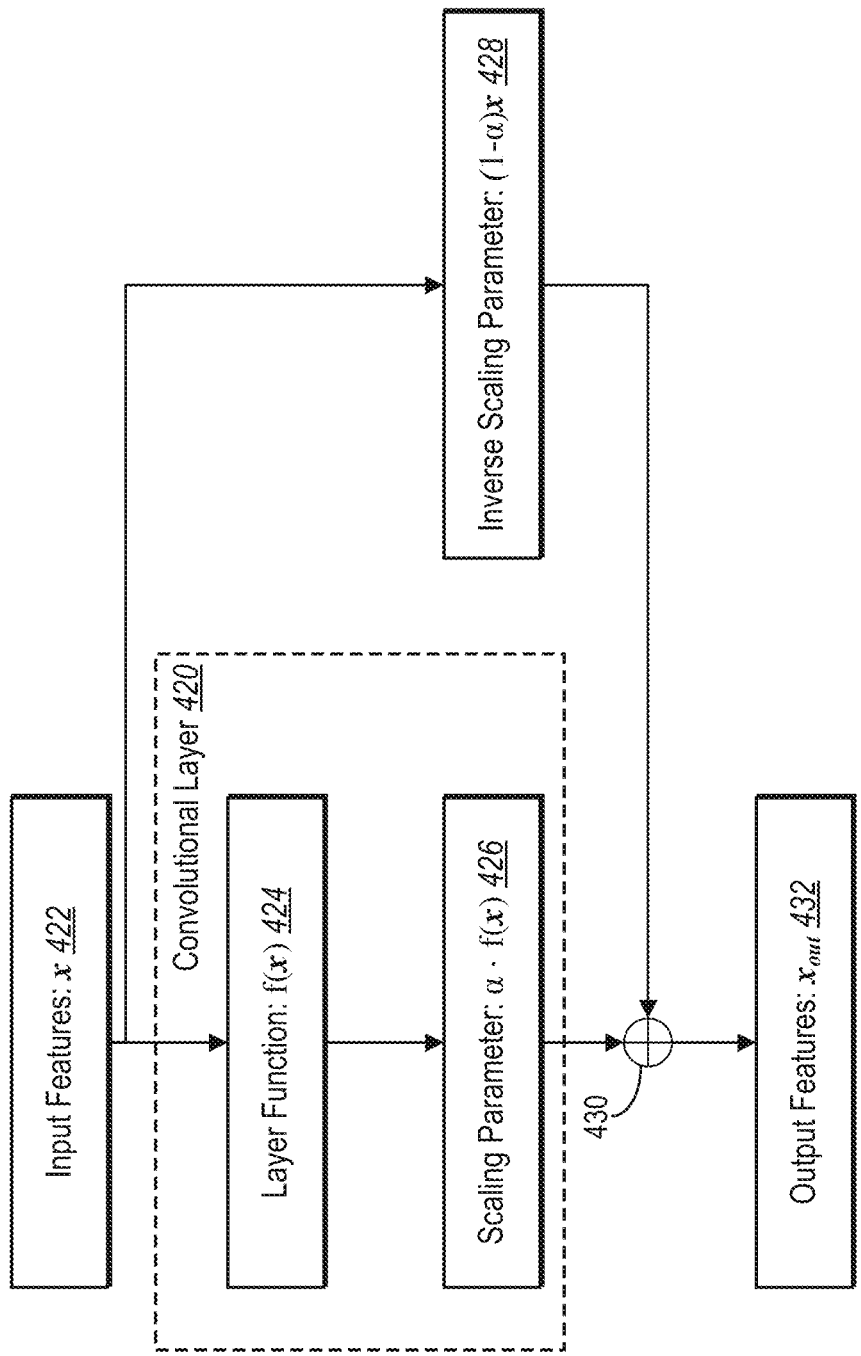
FIG. 4B illustrates a schematic diagram of a skip connection built on top of a convolutional layer for learning a scaling parameter in accordance with one or more implementations.

Turning now to FIGS. 4A-4C, additional disclosure is provided with regard to pruning layers of a neural network. To illustrate, FIG. 4A shows a flow diagram for progressively pruning layers of a neural network in accordance with one or more implementations described herein. As mentioned above, in various implementations, the neural network pruning system prunes batch-normalization layers of a convolutional neural network. In alternative implementations, the neural network pruning system can prune other types of layers in a convolutional neural network. Further, in some implementations, the neural network pruning system can prune layers in other types of neural networks.

In one or more implementations, layer pruning can include an algorithm to determine the impact of a layer within the neural network utilizing a learnable layer scaling parameter (i.e., a). More specifically, the neural network pruning system can add the layer scaling parameter on top of each convolutional layer in the neural network, jointly train the neural network to overlook layers of the neural network by utilizing information (e.g., feature vectors) for a previous layer, and remove layers that are determined to be redundant. Indeed, as further detailed below, the neural network pruning system jointly trains a neural network to learn to overlook redundant layers based on adding a minimization (i.e., the layer scaling parameter $\alpha$) in a loss function.

As illustrated, FIG. 4A includes a series of acts 400 that the neural network pruning system can perform. As shown, the series of acts 400 includes an act 402 of the neural network pruning system initializing a neural network, which has been previously described. As also shown, the series of acts 400 includes an act 404 of the neural network pruning system identifying a pruning parameter, as also described previously. For example, the neural network pruning system can identify a size parameter or a relative parameter as described above in connection with FIG. 2.

As shown, the series of acts 400 includes an act 406 of the neural network pruning system distributing the pruning parameter across multiple training iterations. As disclosed previously, if the pruning parameter is a size parameter, the neural network pruning system can divide the parameter based on the number of training iterations and distribute the divided size parameter to each iteration, as explained above. Also, if the pruning parameter is a relative parameter, the neural network pruning system can distribute the parameter to each iteration, to be applied based on the relative layer scaling parameter values at each iteration, as explained previously.

As shown, FIG. 4A includes the neural network pruning system utilizing progressive layer pruning 408 to perform the series of acts 400. In particular, progressive layer pruning can include an act 410 of the neural network pruning system jointly training network weights and layer scaling parameters (i.e., a) for layers of a neural network. In one or more implementations, the act 410 can include the neural network pruning system training the neural network weights of each layer to perform a given task (e.g., classification). In addition, the act 410 can include the neural network pruning system concurrently training added layer scaling parameters associated with the layers to indicate activity levels of the layers for a given training iteration.

The act 410 can also include the neural network pruning system utilizing a loss function (e.g., a joint loss function) to jointly train the neural network weights and layer scaling parameters. For example, the loss function compares the output of the layers to a ground truth (or other comparative measure) to determine an error amount (e.g., network loss). Further, the loss function can include a loss summation or loss from the layer scaling parameters (e.g., layer scaling factor loss). The neural network pruning system can backpropagate the total loss to update the layer scaling parameters (e.g., by imposing a sparse penalty to encourage layer sparseness via the layer scaling parameters) and the network weights.

To illustrate, the act 410 of jointly training the neural network can be represented mathematically as shown below in Equations 5 and 6.

$$x_{out} = \alpha \cdot f(x) + (1-\alpha) \cdot x \quad (5)$$

In Equation 5, x can represent feature vectors from a previous layer being input into a current layer, f(•) can represent a layer function, and α can represent the layer scaling parameter. Further, $x_{out}$ can represent the output features of the current layer combined with the features of the previous layer weighted by the layer scaling parameter. In addition, the layer scaling parameter α can range from 0-1 (i.e., α∈ (0,1)) after being parameterized by a sigmoid function. FIG. 4B, described below, provides an illustration corresponding to Equation 5.

As shown in Equation 5, the neural network pruning system can learn to decide whether to apply the layer f by encouraging the layer scaling parameter to be sparse. By jointly training the neural network weights with the layer scaling parameter, the neural network pruning system learns when a given layer is passing on redundant or less useful information from a previous layer to a next layer, such that the given layer can be removed from the neural network. Indeed, the neural network pruning system trains or encourages the neural network to learn information from previous layers to make current layers redundant.

$$\mathcal{L}_{tot} = \sum_{(x,y)} \mathcal{L}(\mathcal{F}(x, W), y) + \lambda \sum_i \left| \frac{1}{(0.5 - \text{sigmoind}(\alpha_i))} \right| \quad (6)$$

In Equation 6, $L_{tot}$ represents the total loss of the first term (e.g., the network loss) and the second term (e.g., the layer scaling factor loss). In various implementations, in the first term, L(•) can represent the classification loss function to a layer, F(•) can represent the current neural network structure, x can represent an input, W can represent trainable network weights, and y can represent a corresponding ground truth (e.g., a ground truth classification label). Further, in the second term, λ can represent a tunable hyper-parameter that measures relative importance and weights to the layer scaling parameters (e.g., controls the tradeoff between classification loss and sparsity). Additionally, as mentioned above, α can represent the layer scaling parameter of each layer.

In addition, unlike Equation 4, the second term does not utilize L1 regularization. Rather, because a is remapped to (0, 1) by a sigmoid function, L1 regularization would reach an erroneous result. Instead, the sparse penalty imposed in the loss functions includes (0.5−sigmoid(α)). In this manner, when sigmoid(α) is 0 or 1 (e.g., sigmoid(0) or sigmoid(1)), the loss is smaller (e.g., λ×2) and when sigmoid(α) is close to 0.5, the loss is significantly larger.

Additionally, as part of training, the neural network pruning system can back-propagate the total loss (e.g., the network loss and sparsity regularization/layer scaling factor loss) to the network weights and the layer scaling parameters of the neural network at each iteration. Indeed, in various implementations, the neural network pruning system provides scalar loss back to the layer scaling parameter to update them.

As shown, the progressive layer pruning 408 can include an act 412 of the neural network pruning system pruning layers based on the layer scaling parameter and the distributed pruning parameter. For example, at each training iteration, after training each of the layers, the neural network pruning system can determine which layers to prune based on the pruning parameter. In this manner, the neural network pruning system can automatically identify (i.e., learn) and robustly remove insignificant or less useful layers across the multiple training iterations.

In various implementations, as with channel pruning, the neural network pruning system can prune layers of the neural network based on different pruning parameters, such as the size parameter (i.e., the network size pruning parameter) and the relative parameter (i.e., the relative condition pruning parameter). For instance, the neural network pruning system can prune layers of the neural network based on the size parameter to satisfy a hardware constraint. In another instance, the neural network pruning system can prune layers of the neural network based on a relative parameter. For example, the neural network pruning system applies the layer scaling parameter to the relative parameter as described above in connection with Equation 2 to determine which layers to remove at each iteration.

To prune out layers, in one or more implementations, the neural network pruning system can utilize a binary mask to mask out a given layer and shrink the size of the neural network (e.g., breadth-wise pruning). Indeed, the neural network pruning system can utilize skip-connections to overlook, then remove, a given layer by providing the feature output of the previous layer to the input of the next layer.

As shown, the series of acts 400 includes an act 414 of the neural network pruning system utilizing the pruned neural network. As noted above, in some implementations, the act 414 includes the neural network pruning system utilizing the pruned neural network to obtain results generated by the neural network based on query inputs. In some implementations, the act 414 includes the neural network pruning system providing the pruned neural network to another computing device.

As mentioned above, FIG. 4B illustrates a schematic diagram of a skip connection built on top of a convolutional layer for learning a scaling parameter a in accordance with one or more implementations. For ease in explanation, FIG. 4B is described with respect to a convolutional layer 420 of a convolutional neural network. Notably, the neural network pruning system can perform the acts shown in FIG. 4B with each layer at each training iteration.

As shown, the neural network pruning system provides input features 422 (i.e., x) to the convolutional layer 420. For example, the input features 422 are feature vectors output from the previous convolutional layer within the neural network. Upon receiving the input features 422 at the convolutional layer 420, the neural network pruning system applies a layer function 424 (e.g., f(x)). Indeed, the neural network pruning system generates a feature map or feature vector at the convolutional layer 420 based on the input features 422 and the layer function 424.

Further, the neural network pruning system can apply a scaling parameter 426 (e.g., α×f(x)) to the feature map of the convolutional layer 420. At or near the same time, the neural network pruning system can apply an inverse scaling parameter 428 to the input features 422 (e.g., (1−α)(x)). As shown, the neural network pruning system combines (i.e., act 430) the output of the convolutional layer 420 and the inverse scaling parameter 428 to generate the output features 432 (e.g., $x_{out}$).

As described above in connection with Equation 5, the neural network pruning system can train the layer scaling parameter α to approach zero to encourage layer sparsity. As shown in FIG. 4B, as the layer scaling parameter a approaches zero, the neural network pruning system learns to utilize a greater weight of information from the previous convolutional layer (e.g., the input features 422) and less from the current convolutional layer (e.g., convolutional layer 420). As a result, when the layer scaling parameter for a current layer approaches zero, the neural network pruning system can prune out the current convolutional layer as redundant and decrease the size of the neural network.

As mentioned previously, layer pruning implementations of the neural network pruning system disclosed herein have been found to at least maintain the accuracy of the original neural network as well as increase operational efficiency. To illustrate, FIG. 4C shows the results of researchers who compared layer pruning implementations of the neural network pruning system disclosed herein to other systems based on a network size pruning parameter.

In particular, FIG. 4C shows a fourth table 440 that includes results of the neural network pruning system utilizing progressive layer pruning compared to other systems. As shown, the fourth table 440 evaluates layer pruning implementations of the neural network pruning system against an unpruned baseline neural network (e.g., ResNet-101). The ResNet-101 is a 101 layer deep residual learning neural network that is overparameterized for small datasets. Also, as with the previously described evaluations, the fourth table 440 includes evaluations across the same four datasets (i.e., CIFAR-10, CIFAR-100, Aircraft, and UFC101). Moreover, as part of the evaluation, the top three pooling layers of the neural network were removed before training the neural network and adding the learnable layer scaling parameter onto the other convolutional layers, as described above.

As displayed, the fourth table 440 includes the unpruned baseline neural network (e.g., ResNet-101) as well as two layer-pruning variations by the neural network pruning system. In particular, the fourth table 440 includes the neural network pruning system reducing the baseline neural network to half-size (i.e., ×0.5 Prog.) and quarter-size (i.e., ×0.25 Prog.).

The results of the fourth table 440 show that the neural network pruning system outperformed the baseline model in each instance. Indeed, the evaluations confirm the overfitting issue by showing that the performance of all datasets trained with the unpruned baseline neural network (i.e., ResNet-101) is significantly lower than the layer-pruned neural networks generated by the neural network pruning system. Indeed, though the length of the neural network is reduced to a half and a quarter from the original size, the performance increases significantly compared to the baseline neural network.

Figure 5:
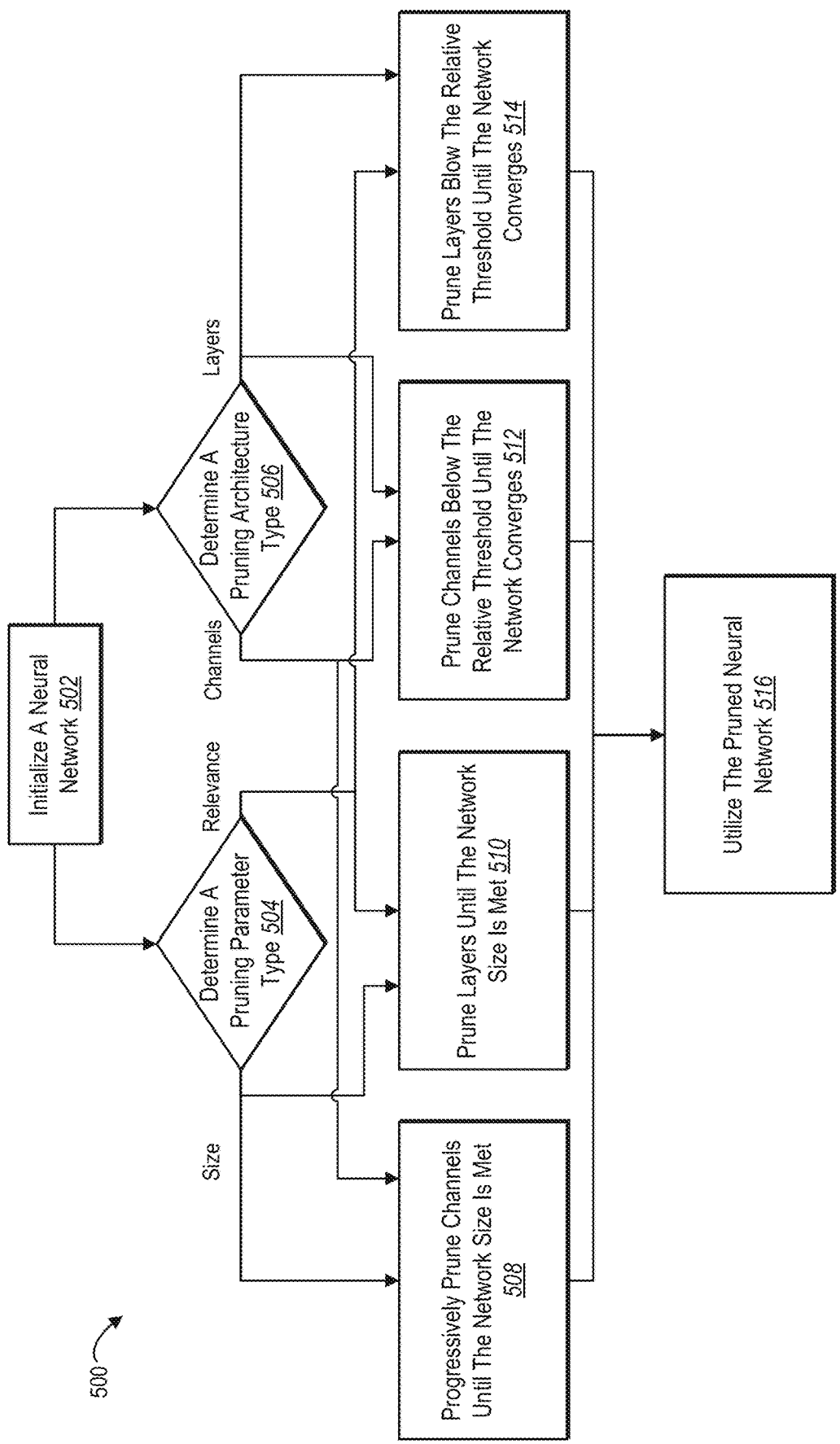
FIG. 5 illustrates a state diagram of progressively pruning a neural network based on various combinations of pruning parameters and pruning architecture types in accordance with one or more implementations.

FIG. 5 illustrates a state diagram of progressively pruning a neural network based on various combinations of pruning parameters and pruning architecture types in accordance with one or more implementations. As shown, FIG. 5 includes a series of acts 500 that the neural network pruning system can perform to progressively prune a neural network.

As shown, the series of acts 500 includes an act 502 of the neural network pruning system initializing a neural network. For example, the neural network pruning system downloads, identifies, builds, loads, generates, organizes, or otherwise prepares a neural network. In various implementations, the neural network is a convolutional neural network. Moreover, in many implementations, the neural network is previously trained to perform a first task or is based on a first dataset and the neural network pruning system is pruning and turning the neural network to perform a second task and/or more efficiently process a second dataset.

As shown, the series of acts 500 includes an act 504 of the neural network pruning system determining a pruning parameter type. For example, as described above in connection with FIG. 2, the neural network pruning system can identify a size parameter (i.e., network size pruning parameter) or a relative parameter (i.e., relative condition pruning parameter).

In addition, as shown, the series of acts 500 includes an act 506 of the neural network pruning system determining a pruning architecture type. For example, as described above in connection with FIGS. 3A-3E, the neural network pruning system can prune channels of the neural network. As described above in connection with FIGS. 4A-4C, the neural network pruning system can prune layers of the neural network.

As shown, based on the neural network pruning system determining a size parameter (e.g., the act 504) and channel pruning (e.g., the act 506), the series of acts 500 includes an act 508 of the neural network pruning system progressively pruning channels until the neural network size is met. For example, as described in connection with Equations 3 and 4, the neural network pruning system can jointly learn network weights and a channel scaling parameter for channels of the neural network, then progressively prune out channels based on the size parameter.

As shown, based on the neural network pruning system determining a size parameter (e.g., the act 504) and layer pruning (e.g., the act 506), the series of acts 500 includes an act 510 of the neural network pruning system progressively pruning layers channels until the neural network size is met. For example, as described in connection with Equations 5 and 6, the neural network pruning system can jointly learn the network weights and a layer scaling parameter for layers of the neural network, then progressively prune out layers based on the size parameter.

As shown, based on the neural network pruning system determining a relative parameter (e.g., the act 504) and channel pruning (e.g., the act 506), the series of acts 500 includes an act 512 of the neural network pruning system progressively pruning channels until the neural network converges. For example, as described in connection with Equations 3 and 4, the neural network pruning system can jointly learn network weights and a channel scaling parameter for each channel of the neural network, then progressively prune out channels based on the relative parameter.

As shown, based on the neural network pruning system determining a relative parameter (e.g., the act 504) and layer pruning (e.g., the act 506), the series of acts 500 includes an act 514 of the neural network pruning system progressively pruning layers until the neural network converges. For example, as described in connection with Equations 5 and 6, the neural network pruning system can jointly learn network weights and a layer scaling parameter for each layer of the neural network, then progressively prune out layers based on the relative parameter.

As shown, the series of acts 500 includes an act 516 of the neural network pruning system utilizing the pruned neural network. As noted above, in some implementations, the act 516 includes the neural network pruning system utilizing the pruned neural network to obtain results generated by the neural network based on query inputs. In some implementations, the act 516 includes the neural network pruning system providing the pruned neural network to another computing device (e.g., a hardware-constrained mobile client device).

In some implementations, the neural network pruning system jointly performs both channel and layer pruning. For example, the neural network pruning system jointly trains the network weights and learns the scaling parameters for the channels and the layers at the same time, as the algorithms and techniques described above are differentiable.

Likewise, as mentioned above, in various implementations, the neural network pruning system can prune a neural network based on both a size parameter and a relative parameter.

Additionally, FIG. 5 and the identified corresponding text describe various implementations of pruning a neural network. Accordingly, the actions and algorithms described in connection with at least FIG. 5, as well as the other figures and Equations referred to therein, provide example structure and architecture for performing a step for progressively pruning the convolutional neural network via a plurality of iterations based on a pruning parameter and scaling parameters. Indeed, the state diagram described in connection with FIG. 5 (and by incorporation, FIGS. 2-4C) provide structure for one or more of the algorithms corresponding to the neural network pruning system for generating a pruned neural network.

Figure 6:
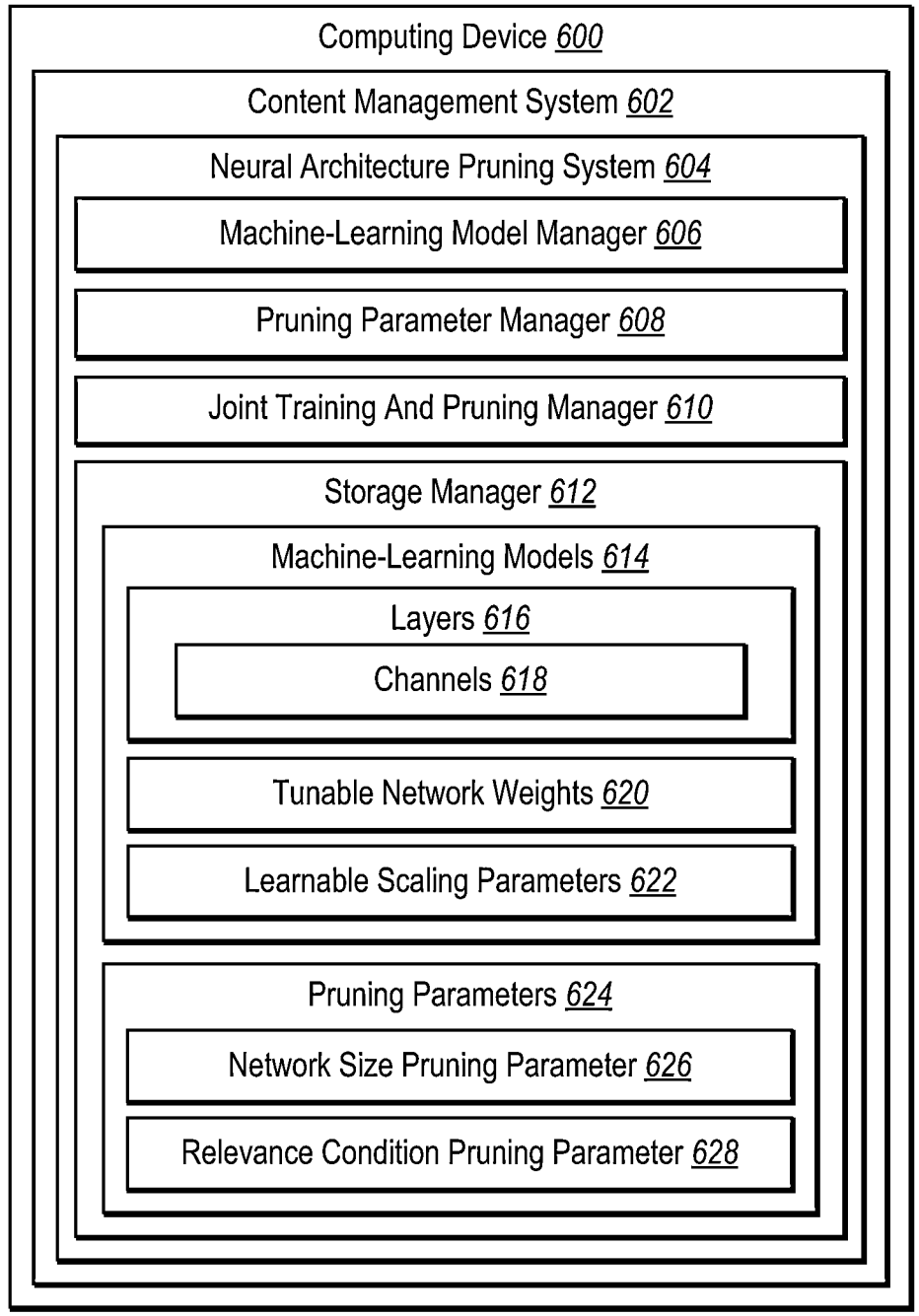
FIG. 6 illustrates a schematic diagram of an example architecture of a network architecture pruning system in accordance with one or more implementations.

Referring now to FIG. 6, additional detail is provided regarding the capabilities and components of a neural network architecture pruning system 604 in accordance with one or more implementations. In particular, FIG. 6 shows a schematic diagram of an example architecture of the neural network architecture pruning system 604 (or simply "neural network pruning system 604") implemented within a content management system 602 and hosted on a computing device 600. The neural network pruning system 604 can represent one or more of the neural network pruning systems previously described.

In addition, the computing device 600 may represent various types of computing devices. For example, in some implementations, the computing device 600 is a non-mobile computing device, such as a server, a cluster of servers, a desktop, or another type of non-mobile computing device. In one or more implementations, the computing device 600 is a mobile computing device, such as a laptop, a tablet, a mobile telephone, a smartphone, a wearable device, or a device connected to the internet. Additional details with regard to the computing device 600 are discussed below with respect to FIG. 9.

As shown, the computing device 600 includes the content management system 602. The content management system 602, in various implementations, can identify, receive, access, open, load, edit, modify, move, copy, share, save, remove, delete, store, download, transmit, and/or import digital content (e.g., text or graphics). For example, the content management system 602 can manage digital documents or digital images that include digital content. In some implementations, the content management system 602 is part of hardware or software native to a client device. In alternative implementations, the content management system 602 is implemented via one or more server devices. Moreover, the content management system 602 can manage digital data (e.g., digital documents, images, or files) for a plurality of users.

As illustrated in FIG. 6, the neural network pruning system 604 includes various components for performing the processes and features described herein. For example, the neural network pruning system 604 includes a machine-learning model manager 606, a pruning parameter manager 608, a joint training and pruning manager 610, and a storage manager 612. As shown, the storage manager 612 includes machine-learning models 614 having layers 616 and channels 618, tunable network weights 620, learnable scaling parameters 622, and pruning parameters 624, which include a network size pruning parameter 626 and a relative condition pruning parameter 628.

As mentioned above, the neural network pruning system 604 includes the machine-learning model manager 606. In various implementations, the machine-learning model manager 606 facilitates the generation, retrieval, identification, access, removal, deletion, transmission, and/or storage of machine-learning models 614. For example, the machine-learning model manager 606 obtains pre-trained machine-learning models 614 and/or assists in generating the machine-learning models 614 from scratch. Some examples of machine-learning models 614 include convolutional neural network and residual learning neural networks.

As described above, the machine-learning models 614 can include layers 616 (e.g., convolutional layers or batch-normalization layers in addition to other layers) that have one or more channels 618 (or neurons). Further, the layers 616 and/or channels 618 can include tunable network weights 620 that are trained for a specific task, as described above.

As shown, the neural network pruning system 604 includes the pruning parameter manager 608. In one or more implementations, the pruning parameter manager 608 generates, identifies, maintains, divides, distributes, removes, modifies, and/or applies pruning parameters 624. For example, the pruning parameter manager 608 can identify and distribute a network size pruning parameter 626 or a relative condition pruning parameter 628. The pruning parameter manager 608 can utilize pruning parameters to determine how to trim layers of a neural network (e.g., a machine-learning model), as described above.

As shown, the neural network pruning system 604 includes a joint training and pruning manager 610. In various implementations, the joint training and pruning manager 610 trains, tunes, updates, prunes, removes, manages, and/or otherwise modifies machine-learning models 614. For example, in one or more implementations, the joint training and pruning manager 610 jointly trains the tunable network weights 620 along with corresponding learnable scaling parameters 622 of a machine-learning model in a progressive manner, as described above. Further, the joint training and pruning manager 610 progressively prunes portions (e.g., the layers 616 and/or the channels 618) of a machine-learning model based on the learnable scaling parameters 622 and pruning parameters 624 (e.g., the network size pruning parameter 626 and the relative condition pruning parameter 628), as described above.

As shown, the neural network pruning system 604 includes the storage manager 612. As mentioned, the storage manager 612 includes the machine-learning models 614 having the layers 616 and the channels 618, the tunable network weights 620, the learnable scaling parameters 622, and the pruning parameters 624, which include the network size pruning parameter 626 and the relative condition pruning parameter 628.

Each of the components 606-628 of the neural network pruning system 604 can include software, hardware, or both. For example, the components 606-628 can include one or more instructions stored on a computer-readable storage medium and executable by processors of one or more computing devices, such as a client device (e.g., a mobile client device) or server device. When executed by the one or more processors, the computer-executable instructions of the neural network pruning system 604 can cause a computing device to perform the feature learning methods described herein. Alternatively, the components 606-628 can include hardware, such as a special-purpose processing device to perform a certain function or group of functions. In addition, the components 606-628 of the neural network pruning system 604 can include a combination of computer-executable instructions and hardware.

Furthermore, the components 606-628 of the neural network pruning system 604 may be implemented as one or more operating systems, as one or more stand-alone applications, as one or more modules of an application, as one or more plug-ins, as one or more library functions or functions that may be called by other applications, and/or as a cloud-computing model. Thus, the components 606-628 may be implemented as a stand-alone application, such as a desktop or mobile application. Additionally, the components 606-628 may be implemented as one or more web-based applications hosted on a remote server. The components 606-628 may also be implemented in a suite of mobile device applications or "apps." To illustrate, the components 606-628 may be implemented in an application, including but not limited to ADOBE® SENSEI® or ADOBE® ANALYTICS CLOUD. "ADOBE," "SENSEI," and "ANALYTICS CLOUD" are either registered trademarks or trademarks of Adobe Inc. in the United States and/or other countries.

Figure 7:
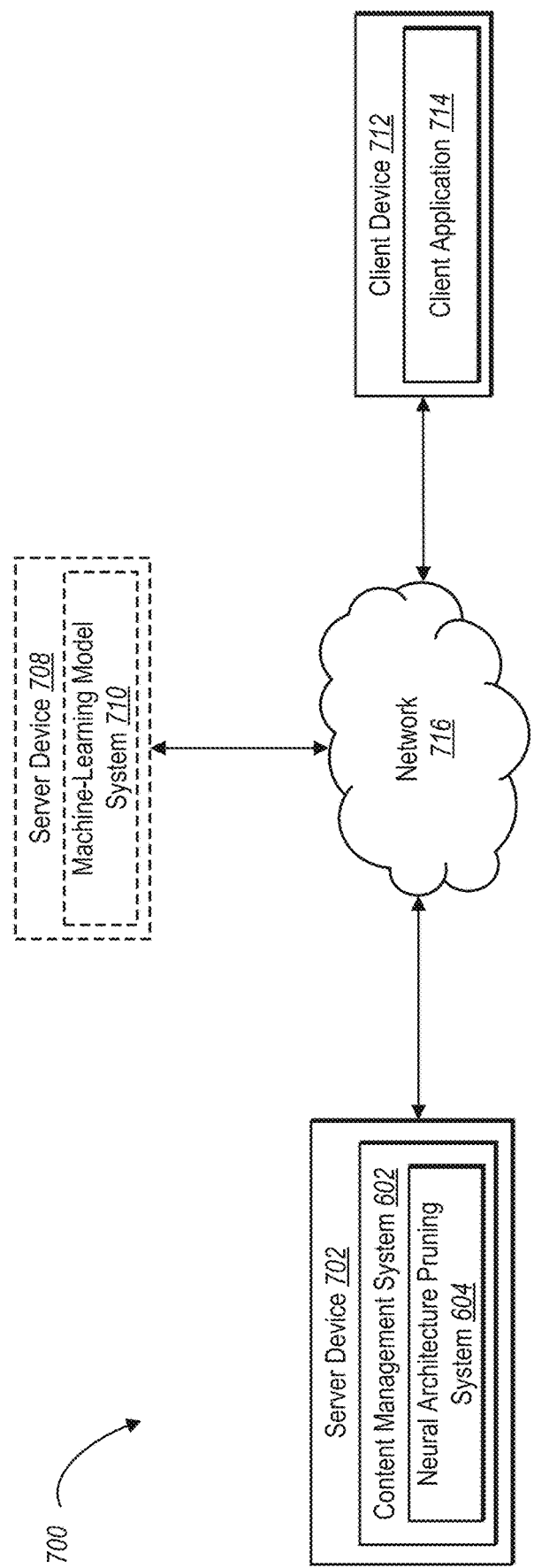
FIG. 7 illustrates a schematic diagram of an environment in which a neural network architecture pruning system can operate in accordance with one or more implementations.

FIG. 7 illustrates a schematic diagram of a system 700 in which the neural network pruning system 604 can operate in accordance with one or more implementations. As shown in FIG. 7, the system 700 includes a server device 702, an optional server device 708, and a client device 712 connected via a network 716. Additional detail regarding computing devices (e.g., the server device 702, the optional server device 708, and the client device 712) is provided below in connection with FIG. 9. Further, FIG. 9 also provides detail regarding networks, such as the illustrated network 716.

Although FIG. 7 illustrates a particular number, type, and arrangement of components within the system 700, various additional environment configurations are possible. For example, the server device 702 can represent a set of connected server devices. As another example, the system 700 can include any number of client devices. As a further example, one or more portions or components of the optional server device 708 (e.g., the machine-learning model system 710) may reside within the server device 702.

As shown, the system 700 includes the server device 702 implementing the content management system 602 and the neural network pruning system 604, which are described above. As mentioned above, the neural network pruning system 604 generates a pruned neural network that maintains the same level of accuracy as a non-pruned neural network. Further, the pruned neural network can perform the same operations with greater efficiency (e.g., less real-time memory and computational power).

In addition, the system 700 also includes an optional server device 708 having the machine-learning model system 710. In general, the machine-learning model system 710 generates, trains, stores, and/or applies machine-learning models. In various implementations, the neural network pruning system 604 obtains a pre-trained machine-learning model from the machine-learning model system 710 to retrain and prune the machine-learning model (e.g., transfer learning). In alternative implementations, the neural network pruning system 604 generates a machine-learning model from scratch and/or otherwise obtains a pre-trained machine-learning model.

Moreover, in one or more implementations, the client device 712 can include all, or a portion of, the neural network pruning system 604. For example, the neural network pruning system 604 is implemented within the client application 714 on the client device 712. In alternative implementations, the client device 712 can download all or a portion of a software application (e.g., as part of the client application 714) corresponding to the neural network pruning system 604 such that at least a portion of the operations performed by the neural network pruning system 604 occur on the client device 712. In some implementations, the client application 714 obtains and utilizes a pruned neural network pruned by the neural network pruning system 604.

FIGS. 1-7, the corresponding text, and the examples provide a number of different methods, systems, devices, and non-transitory computer-readable media of the neural network pruning system 604. In addition to the foregoing, one or more implementations can also be described in terms of flowcharts comprising acts for accomplishing a particular result, such as the flowcharts of acts shown in FIG. 8. Additionally, the acts described herein may be repeated or performed in parallel with one another or parallel with different instances of the same or similar acts.

Figure 8:
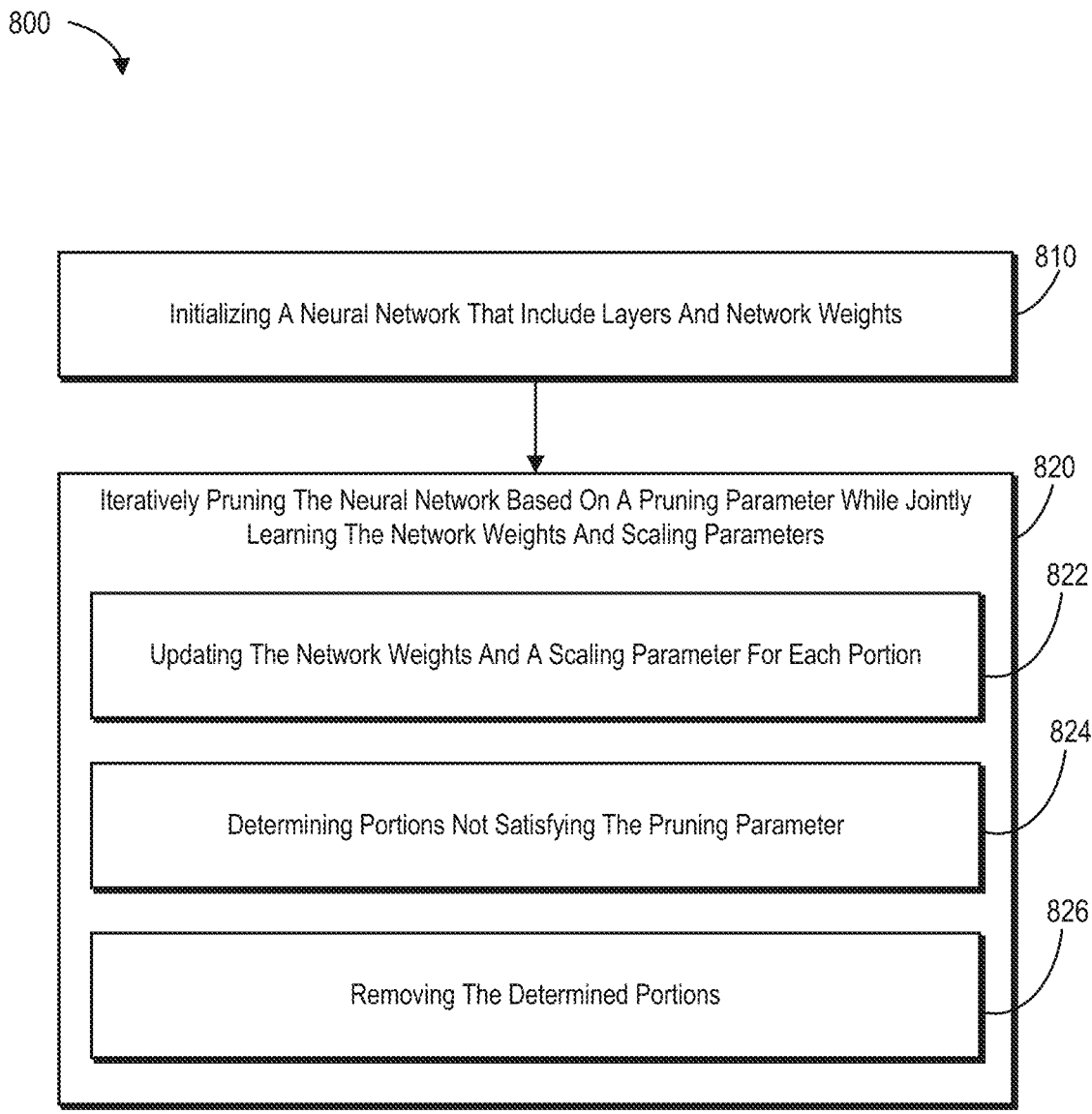
FIG. 8 illustrates a flowchart of a series of acts of pruning neural networks in digital documents in accordance with one or more implementations.

As mentioned previously, FIG. 8 illustrates a flowchart of a series of acts 800 of pruning convolutional neural networks in accordance with one or more implementations. While FIG. 8 illustrates acts according to one implementation, alternative implementations may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some implementations, a system can perform the acts of FIG. 8.

In one or more implementations, the series of acts 800 is implemented on one or more computing devices, such as the computing device 600, the server device 702, or the client device 712. In addition, in some implementations, the series of acts 800 is implemented in a digital medium environment for utilizing neural networks. For example, the series of acts 800 is implemented on a computing device having memory that includes a convolutional neural network having batch-normalization layers and network weights.

The series of acts 800 can include an act 810 of initializing a neural network that includes layers and network weights. In some implementations, the act 810 can involve initializing a convolutional neural network including a plurality of batch-normalization layers and a plurality of network weights. In one or more implementations, the portions of the convolutional neural network include batch-normalization layers of the convolutional neural network. In various implementations, the portions of the convolutional neural network include channels within the plurality of batch-normalization layers of the convolutional neural network.

As shown, the series of acts 800 also includes an act 820 of iteratively pruning the neural network based on a pruning parameter while jointly learning the neural network weights and scaling parameters. In particular, the act 820 can involve iteratively pruning the convolutional neural network based on a pruning parameter while jointly learning the neural network weights and scaling parameters. In one or more implementations, the act 820 includes pruning the convolutional neural network for a fixed number of iterations. In some implementations, the act 820 includes pruning the convolutional neural network until the neural network converges.

As shown, the act 820 can include various sub-acts. For example, the act 820 includes a sub-act 822 of updating the neural network weights and a scaling parameter for each portion. In particular, the sub-act 822 can include updating the neural network weights and a scaling parameter for each portion. In one or more implementations, the sub-act 822 includes updating the neural network weights and scaling parameters of the plurality of batch-normalization layers. In some implementations, the sub-act 822 includes updating, at each iteration, the scaling parameters by penalizing non-zero scaling parameters to encourage sparseness among the portions of the convolutional neural network.

As shown, the act 820 includes a sub-act 824 of determining portions not satisfying the pruning parameter. In particular, the sub-act 824 can include determining portions of the convolutional neural network that generate scaling parameters not satisfying the pruning parameter. In one or more implementations, the sub-act 824 includes identifying batch-normalization layers of the plurality of batch-normalization layers that generate a scaling parameter below a pruning parameter.

In some implementations, the pruning parameter is a network size pruning parameter. In additional implementations, the sub-act 824 includes generating a distributed pruning parameter by dividing the pruning parameter (e.g., the network size pruning parameter) by the fixed number of iterations and applying the distributed pruning parameter at each iteration of the fixed number of iterations to determine if the scaling parameter satisfies the distributed pruning parameter. In various implementations, the pruning parameter includes a relative condition pruning parameter of the convolutional neural network. In these implementations, the sub-act 824 can also include determining, at each iteration, portions of the convolutional neural network having a scaling parameter that is less than the relative condition pruning parameter.

As shown, the act 820 includes a sub-act 826 of removing the determined portions. In particular, the sub-act 826 can include modifying an architecture of the convolutional neural network by removing the determined portions. In one or more implementations, the sub-act 824 includes modifying an architecture of the convolutional neural network by removing the batch-normalization layers from the convolutional neural network that generate a scaling parameter below the pruning parameter. In some implementations, the sub-act 826 includes iteratively pruning portions of the convolutional neural network until a network size pruning parameter is satisfied. In various implementations, the sub-act 824 includes stopping pruning the convolutional neural network when non-pruned batch-normalization layers remain at or above a relevance condition pruning parameter for a minimum number of iterations.

The series of acts 800 can include various additional acts. For example, the series of acts 800 can include the act of skipping fine-tuning of the convolutional neural network after iteratively pruning the convolutional neural network. In one or more implementations, the convolutional neural network is trained for a first task and progressively pruning the convolutional neural network includes training the convolutional neural network for a second task. In some implementations, the first task includes classification and the second task includes residual learning.

In one or more implementations, a given batch-normalization layer of the plurality of batch-normalization layers includes a plurality of channels. In these implementations, the series of acts 800 can include pruning the batch-normalization layers by updating the neural network weights and scaling parameters of the plurality of channels within the given batch-normalization layer, determining that one or more scaling parameters of the plurality of channels are below a relevance condition pruning parameter; and removing one or more channels from the given batch-normalization layer corresponding to the one or more scaling parameters that are below the relevance condition pruning parameter.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the neural network pruning system to jointly train and prune machine-learning models, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
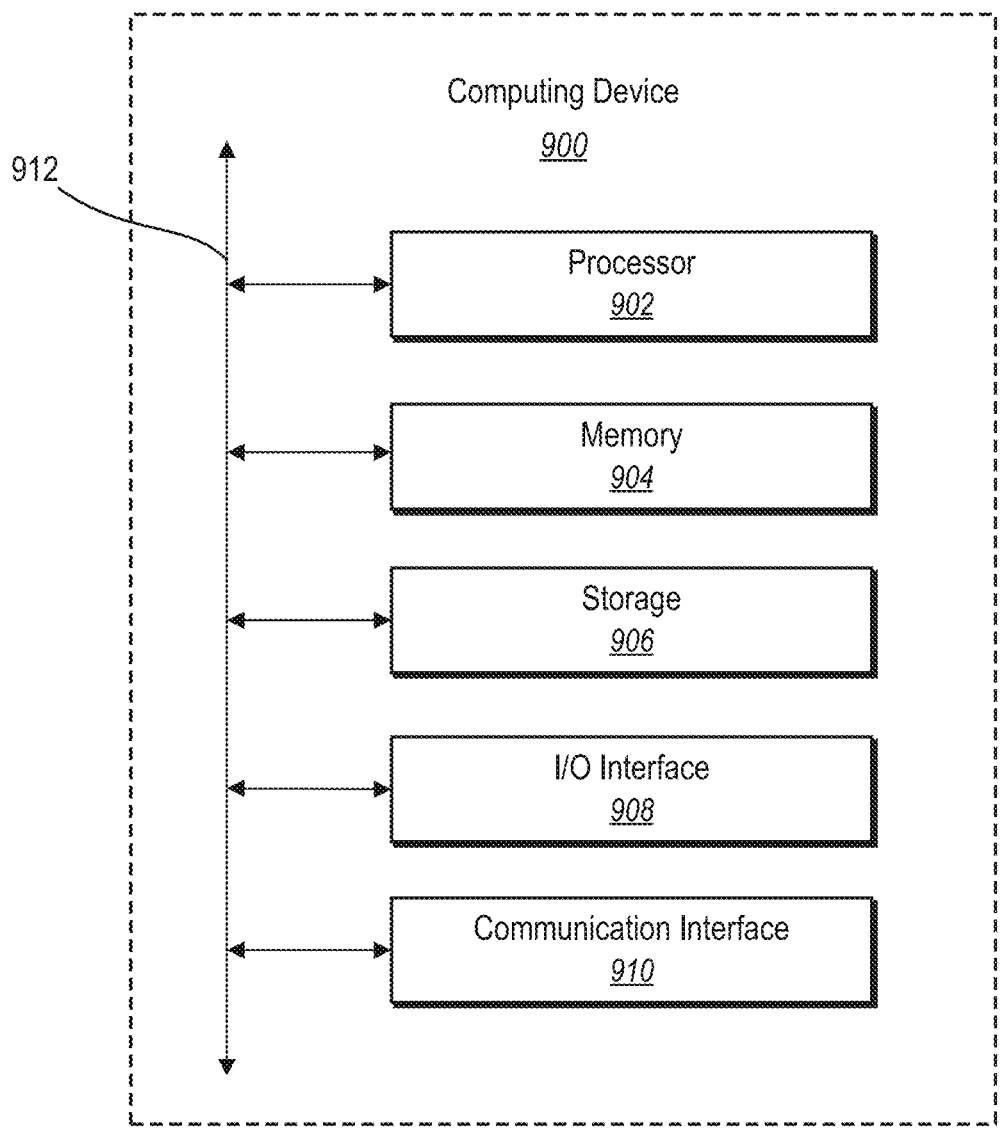
FIG. 9 illustrates a block diagram of an example computing device for implementing one or more implementations of the present disclosure.

FIG. 9 illustrates a block diagram of an example computing device 900 that may be configured to perform one or more of the processes described above. One will appreciate that one or more computing devices, such as the computing device 600, the server device 702, or the client device 712. In one or more implementations, the computing device 900 may be a non-mobile device (e.g., a desktop computer, a server device, a web server, a file server, a social networking system, a program server, an application store, or a content provider). Further, the computing device 900 may be a server device that includes cloud-based processing and storage capabilities. In some implementations, the computing device 900 may be a mobile device (e.g., a laptop, a tablet, a smartphone, a mobile telephone, a camera, a tracker, a watch, a wearable device, etc.).

As shown in FIG. 9, the computing device 900 can include one or more processor(s) 902, memory 904, a storage device 906, input/output ("I/O") interfaces 908, and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other implementations. Furthermore, in certain implementations, the computing device 900 includes fewer components than those shown in FIG. 9. Components of the computing device 900 shown in FIG. 9 will now be described in additional detail.

In particular implementations, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (e.g., user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of these I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    initializing a convolutional neural network comprising a plurality of batch-normalization layers and a plurality of neural network weights; and
    pruning the convolutional neural network based on a pruning parameter while jointly learning the plurality of neural network weights and scaling parameters by iteratively:
        updating the plurality of neural network weights for each portion of the convolutional neural network;
        updating a scaling parameter for each portion of the convolutional neural network by penalizing non-zero scaling parameters to encourage sparseness among portions of the convolutional neural network;
        determining a set of portions of the convolutional neural network that generate scaling parameters not satisfying the pruning parameter; and
        modifying an architecture of the convolutional neural network by removing the set of determined portions.

2. The non-transitory computer-readable medium of claim 1, wherein pruning the convolutional neural network comprises pruning the convolutional neural network for a fixed number of iterations.

3. The non-transitory computer-readable medium of claim 2, further comprising instructions, that when executed by the at least one processor, cause the at least one processor to perform operations comprising generating a distributed pruning parameter by dividing the pruning parameter by the fixed number of iterations; and
    wherein iteratively pruning the convolutional neural network comprises iteratively pruning the convolutional neural network by applying the distributed pruning parameter at each iteration of the fixed number of iterations.

4. The non-transitory computer-readable medium of claim 1, further comprising instructions, that when executed by the at least one processor, cause the at least one processor to perform operations comprising skipping fine-tuning of the convolutional neural network after iteratively pruning the convolutional neural network.

5. The non-transitory computer-readable medium of claim 1, wherein the portions of the convolutional neural network comprise channels within the plurality of batch-normalization layers of the convolutional neural network.

6. The non-transitory computer-readable medium of claim 1, wherein the portions of the convolutional neural network comprise batch-normalization layers of the convolutional neural network.

7. The non-transitory computer-readable medium of claim 1, wherein:
    the pruning parameter comprises a network size pruning parameter of the convolutional neural network; and
    iteratively pruning the convolutional neural network comprises iteratively pruning the portions of the convolutional neural network until the network size pruning parameter is satisfied.

8. The non-transitory computer-readable medium of claim 1, wherein the pruning parameter comprises a relative condition pruning parameter of the convolutional neural network.

9. The non-transitory computer-readable medium of claim 8, wherein the instructions, when executed by the at least one processor, cause the at least one processor to perform operations comprising determining, at each iteration, portions of the convolutional neural network having a scaling parameter that is less than the relative condition pruning parameter.

10. A system comprising:
    one or more memory devices comprising:
        a convolutional neural network comprising a plurality of batch-normalization layers; and
        a plurality of neural network weights; and
    one or more processors configured to cause the system to:
        prune the plurality of batch-normalization layers of the convolutional neural network while jointly learning the plurality of neural network weights and scaling parameters by iteratively performing, until convergence of the convolutional neural network, by:
            updating the plurality of neural network weights and the scaling parameters of the plurality of batch-normalization layers;

identifying batch-normalization layers of the plurality of batch-normalization layers that generate scaling parameters that are below a pruning parameter; and modifying an architecture of the convolutional neural network by removing the batch-normalization layers from the convolutional neural network that generate scaling parameters that are below the pruning parameter; and stop pruning the convolutional neural network when non-pruned batch-normalization layers remain at or above a relevance condition pruning parameter for a minimum number of iterations.

11. The system of claim 10, wherein:

the convolutional neural network is trained for a first task; and progressively pruning the convolutional neural network comprises training the convolutional neural network for a second task.

12. The system of claim 10, wherein:

a given batch-normalization layer of the plurality of batch-normalization layers comprises a plurality of channels; and pruning the plurality of batch-normalization layers comprises:

updating the plurality of neural network weights and the scaling parameters of the plurality of channels within the given batch-normalization layer;

determining that one or more scaling parameters of the plurality of channels are below a relevance condition pruning parameter; and removing one or more channels from the given batch-normalization layer corresponding to the one or more scaling parameters that are below the relevance condition pruning parameter.

13. The system of claim 10, wherein the one or more processors are further configured to cause the system to train, at each iteration, the scaling parameters of the plurality of batch-normalization layers by penalizing non-zero scaling parameters.

14. The system of claim 10, wherein the one or more processors are further configured to cause the system to not perform fine-tuning of the convolutional neural network after pruning the batch-normalization layers of the convolutional neural network.

15. A computer-implemented method comprising:

initializing convolutional neural network comprising a plurality of batch-normalization layers and a plurality of neural network weights;

performing a step for progressively pruning the convolutional neural network via a plurality of iterations based on a pruning parameter and scaling parameters; and utilizing the pruned convolutional neural network to generate a predictive result based on query input data.

16. The computer-implemented method of claim 15, wherein the convolutional neural network is previously trained for a first task that is different from a second task associated with generating the predictive result based on the query input data.

17. The computer-implemented method of claim 16, wherein:

the first task comprises classification; and the second task comprises residual learning.

18. The computer-implemented method of claim 15, wherein the pruning parameter comprises a relative condition pruning parameter of the convolutional neural network.

19. The non-transitory computer-readable medium of claim 7, wherein the network size pruning parameter indicates a final size of the convolutional neural network after pruning.

20. The non-transitory computer-readable medium of claim 7, wherein the network size pruning parameter indicates a percentage of the convolutional neural network to prune away.

* * * * *